United States Patent
Yamada et al.

(10) Patent No.: US 12,118,786 B2
(45) Date of Patent: Oct. 15, 2024

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Takayuki Yamada, Kanagawa (JP); Kazuya Ogasawara, Kanagawa (JP); Shinjiro Hori, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 178 days.

(21) Appl. No.: 17/533,708

(22) Filed: Nov. 23, 2021

(65) Prior Publication Data

US 2022/0172471 A1 Jun. 2, 2022

(30) Foreign Application Priority Data

Nov. 30, 2020 (JP) ................................. 2020-198581

(51) Int. Cl.
  *G06V 20/00* (2022.01)
  *G06V 10/94* (2022.01)
  *G06V 20/30* (2022.01)
  *G06V 40/16* (2022.01)

(52) U.S. Cl.
  CPC ............ *G06V 20/30* (2022.01); *G06V 10/945* (2022.01); *G06V 40/161* (2022.01)

(58) Field of Classification Search
  CPC .............. G06F 3/0484; H04N 1/00196; H04N 1/00456; H04N 1/00167; G06V 20/30; G06V 10/761; G06T 2200/24; G06T 11/00; G06T 7/0002; G06T 2207/30168
  See application file for complete search history.

(56) References Cited

U.S. PATENT DOCUMENTS

| | | |
|---|---|---|
| 8,620,105 B2 | 12/2013 | Hori et al. |
| 9,052,742 B2 | 6/2015 | Hori et al. |
| 9,704,221 B2 | 7/2017 | Hori et al. |
| 10,699,400 B2 | 6/2020 | Hori et al. |
| 10,726,539 B2 | 7/2020 | Hori et al. |
| 10,742,823 B2 | 8/2020 | Iguchi et al. |
| 11,089,170 B2 | 8/2021 | Kunieda et al. |

(Continued)

FOREIGN PATENT DOCUMENTS

JP 2018-097483 A 6/2018

*Primary Examiner* — Molly Wilburn
*Assistant Examiner* — Ahmed A Nasher
(74) *Attorney, Agent, or Firm* — Venable LLP

(57) ABSTRACT

A first designation unit configured to designate a first image group, a second designation unit configured to designate a second image group, an analysis unit configured to analyze an image included in the second image group, a determination unit configured to determine a reference for selecting an image from the first image group, based on a result of analyzing the image included in the second image group, a selection unit configured to select a third image group from the first image group, based on the reference, and a changing unit configured to accept a change in a parameter that is obtained from the third image group selected by the selection unit are included and to produce a changed parameter. The selection unit is configured to select an image from the first image group by use of the changed parameter.

18 Claims, 17 Drawing Sheets

(56) References Cited

U.S. PATENT DOCUMENTS

| | | | |
|---|---|---|---|
| 2012/0321223 A1* | 12/2012 | Nagasaka | H04N 1/00448 |
| | | | 382/305 |
| 2016/0239519 A1* | 8/2016 | Levy | G06F 16/5838 |
| 2020/0090369 A1* | 3/2020 | Yamaji | G06V 20/30 |
| 2020/0142555 A1* | 5/2020 | Yamagishi | G06F 3/04817 |
| 2020/0388062 A1 | 12/2020 | Kunieda et al. | |
| 2020/0388063 A1 | 12/2020 | Kunieda et al. | |
| 2022/0269720 A1* | 8/2022 | Luo | G06F 3/04845 |

\* cited by examiner

| IMAGE ID | SHOOTING DATE AND TIME | FOCUS | THE NUMBER OF FACES | FACE IMAGE ID | INDIVIDUAL ID | | | | | | | | | | OBJECT |
|---|---|---|---|---|---|---|---|---|---|---|---|---|---|---|---|
| | | | | | 1 | | | 2 | | | 3 | | | ... | |
| | | | | | UPPER LEFT POSITION | LOWER RIGHT POSITION | SIMILARITY | UPPER LEFT POSITION | LOWER RIGHT POSITION | SIMILARITY | UPPER LEFT POSITION | LOWER RIGHT POSITION | SIMILARITY | | |
| 001 | 2015/7/1 10h11m12s | DESIRABLE | 4 | 1 | 40, 40 | 40, 40 | 0.95 | 90, 40 | 115, 65 | 0.85 | 10, 20 | 25, 35 | 0.88 | ... | - |
| 002 | 2015/7/1 10h12m30s | DESIRABLE | 2 | 2 | 50, 100 | 50, 100 | 0.12 | 150, 125 | 190, 165 | 0.94 | - | - | - | ... | FLOWER |
| 003 | 2015/7/1 10h15m54s | DESIRABLE | 0 | - | - | - | - | - | - | - | - | - | - | ... | DOG |
| ... | ... | ... | ... | ... | ... | ... | ... | ... | ... | ... | ... | ... | ... | ... | ... |

FIG.7

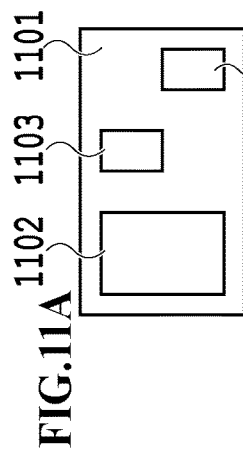
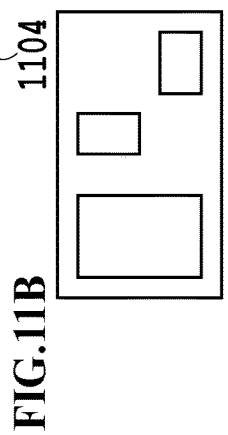
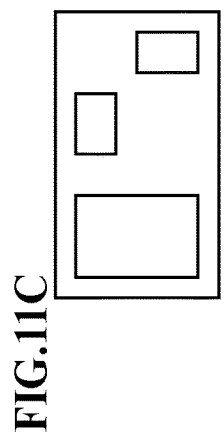
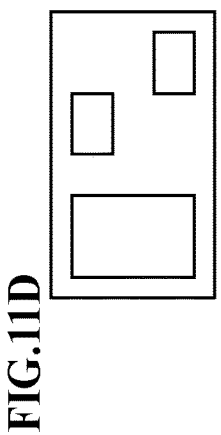
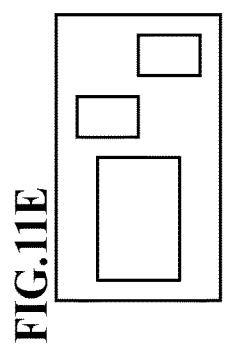
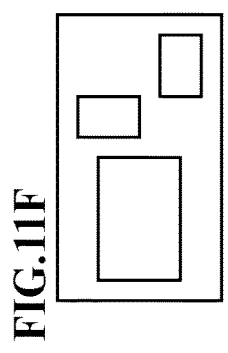
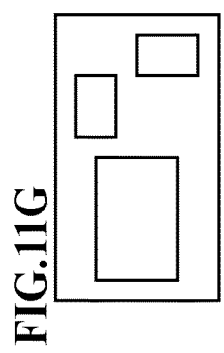
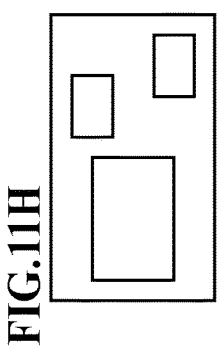
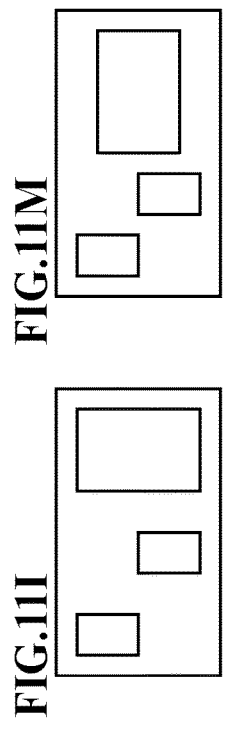
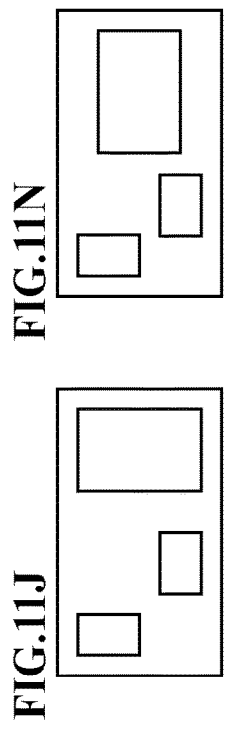
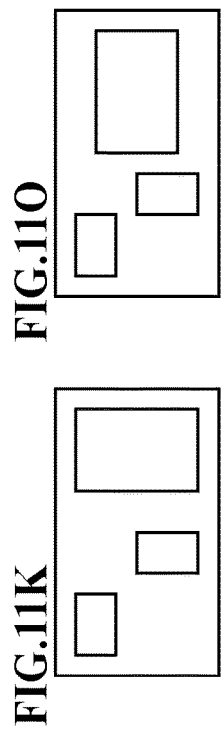
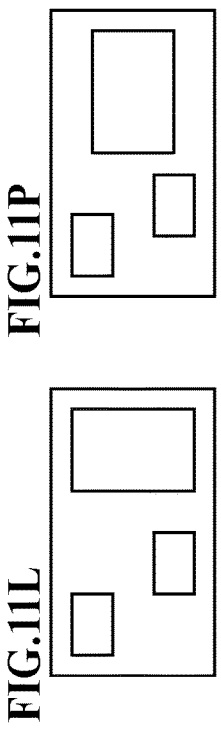
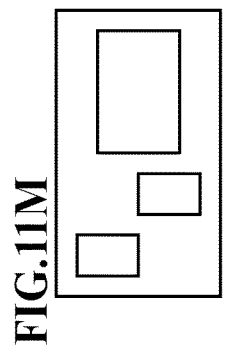
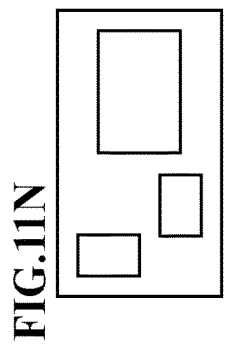
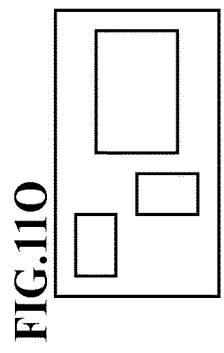
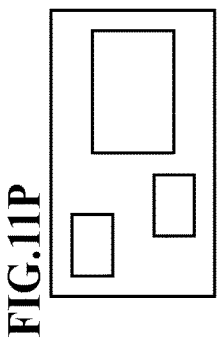
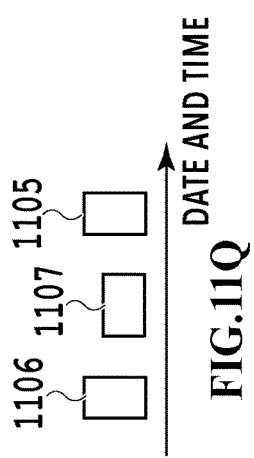

IMAGE PROCESSING APPARATUS, IMAGE PROCESSING METHOD, AND STORAGE MEDIUM

CROSS-REFERENCE TO PRIORITY APPLICATION

This application claims the benefit of Japanese Patent Application No. 2020-198581, filed Nov. 30, 2020, which is hereby incorporated by reference herein in its entirety.

BACKGROUND

Field of the Invention

The present disclosure relates to a technology for selecting one or more images from multiple images according to a predetermined reference.

Description of the Related Art

There is an automatic layout technology that automatically selects an image for creating an album from multiple images, automatically determines a template for the album, and automatically allocates the image to the template.

Japanese Patent Laid-Open No. 2018-97483 (the '483 document) discloses a technology for adjusting the appearance frequency of a main object in an image group of automatically-selected album candidates according to a designation by a user. Further, the '483 document discloses a technology in which a score and identification information, which is indicative of a specific object, are given to image data, so that images are selected according to the priorities of objects that are set according to the scores and user's designation.

However, in the method described in the '483 document, there is a possibility that images in line with the user's intention are not appropriately selected.

SUMMARY

An image processing apparatus according to an embodiment of the present disclosure includes a first designation unit configured to designate a first image group, a second designation unit configured to designate a second image group, an analysis unit configured to analyze an image included in the second image group; a determination unit configured to determine a reference for selecting an image from the first image group, based on a result of analyzing the image included in the second image group, a selection unit configured to select a third image group from the first image group, based on the reference, and a changing unit configured to accept a change in a parameter that is obtained from the third image group selected by the selection unit and to produce a changed parameter, wherein the selection unit is configured to select an image from the first image group by use of the changed parameter.

Further features of the present disclosure will become apparent from the following description of exemplary embodiments with reference to the attached drawings.

BRIEF DESCRIPTION OF THE DRAWINGS

FIG. 7 is a diagram illustrating feature amounts;

FIG. 11A through FIG. 11Q are diagrams illustrating a template group to be used for layout of image data;

DESCRIPTION OF THE EMBODIMENTS

Hereafter, a detailed explanation will be given of embodiments of the present invention with reference to the attached drawings. The following embodiments do not limit the present invention according to the scope of the patent claims, and all combinations of the characteristics explained in the present embodiments are not necessarily essential to the solution of the present invention. The same constituent elements are assigned with the same reference numbers, so that the explanations thereof will be omitted.

First Embodiment

In the present embodiment, an explanation will be given with the example of a method in which an application (hereafter may also be referred to as an "app") for creating an album is operated by an image processing apparatus, so as to generate an automatic layout. In the following explanation, unless otherwise specified, an "image" includes a still image, a moving image, and a frame image extracted from a moving image. Further, an image here may include a still image, a moving image, and a frame image in a moving image that are held on a network, such as in a service on a network or a storage on a network, and can be obtained via the network.

Figure 1:
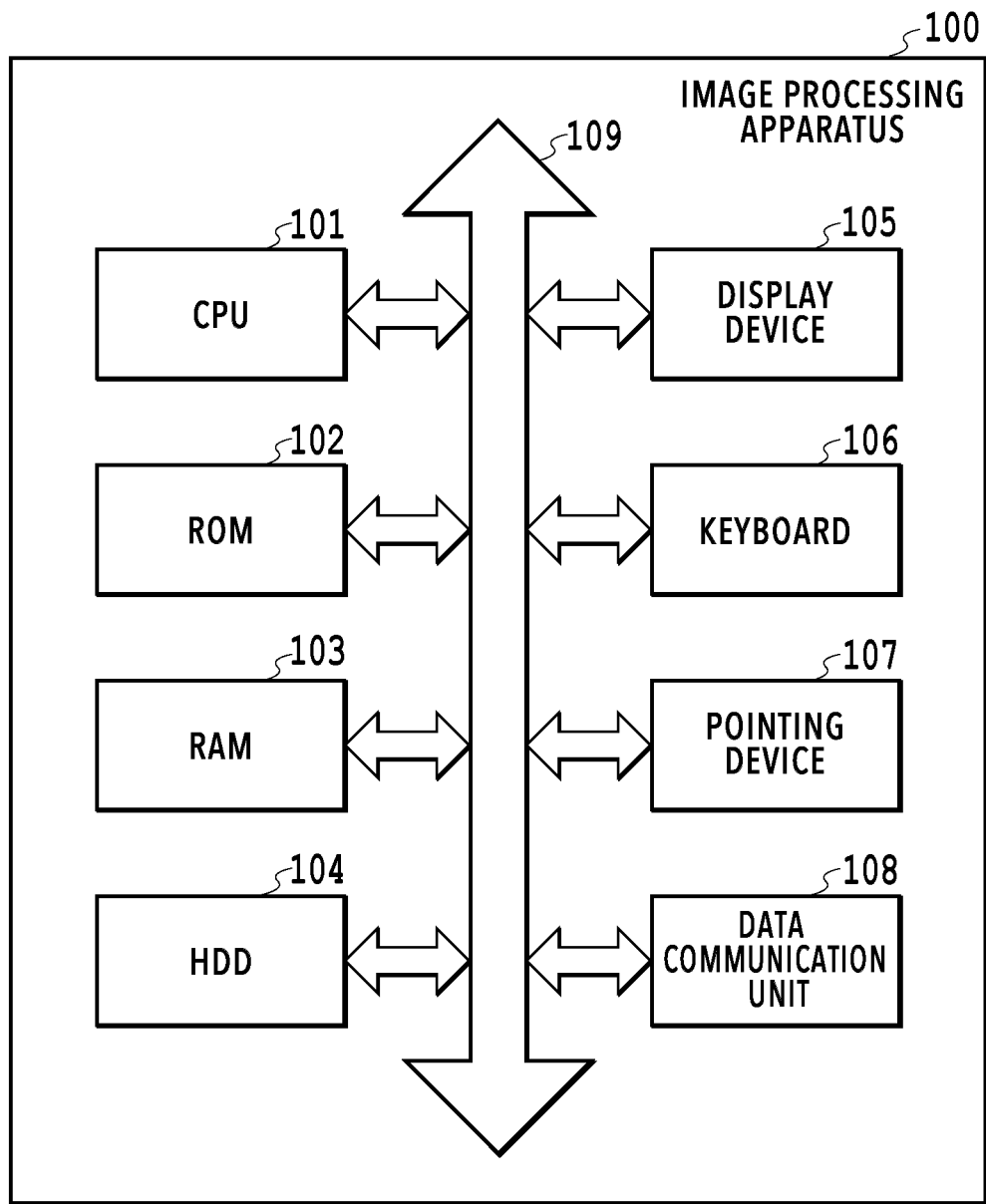
FIG. 1 is a block diagram illustrating a hardware configuration of an image processing apparatus.

FIG. 1 is a block diagram illustrating a hardware configuration of an image processing apparatus. Examples of the image processing apparatus 100 include a personal computer (hereafter referred to as a PC), a smartphone, etc. In the present embodiment, an explanation will be given on the premise that the image processing apparatus is a PC. The image processing apparatus 100 includes a CPU (Central Processing Unit/Processor) 101, a ROM 102, a RAM 103, an HDD 104, a display device 105, a keyboard 106, a pointing device 107, and a data communication unit 108.

The CPU (Central Processing Unit/Processor) 101 comprehensively controls the image processing apparatus 100 to implement the operation of the present embodiment by reading out a program that is stored in the ROM 102 onto the RAM 103 and executing the program, for example. Although the number of CPUs is one in FIG. 1, a configuration with multiple CPUs is also possible. The ROM 102 is a general-purpose ROM, which stores a program to be executed by the CPU 101, for example. The RAM 103 is a general-purpose RAM, which is used as a working memory for temporarily storing various kinds of information at the timing when the CPU 101 executes a program, for example. The HDD (hard disk) 104 is a storage medium (storage unit) for storing an image file, a database that holds processing results of image analysis, or the like, a template to be used by the album creation application, etc.

The display device 105 is a display unit that displays a user interface (UI) of the present embodiment and an electronic album as a layout result of image data (hereafter also referred to as an "image") for the user. The keyboard 106 and the pointing device 107 receive an instruction operation from the user. The display device 105 may be equipped with a touch sensor function. For example, the keyboard 106 is used by the user to input the number of double spreads of the album to be created on the UI, which is displayed on the display device 105. For example, the pointing device 107 is used by the user to click a button on the UI, which is displayed on the display device 105.

The data communication unit 108 performs communication with an external device via a wired or wireless network, etc. For example, the data communication unit 108 transmits the data that has been laid out by the automatic layout function to a printer or a server that is capable of communicating with the image processing apparatus 100. The data bus 109 connects the respective blocks of FIG. 1 in a mutually communicable manner.

The configuration illustrated in FIG. 1 is merely an example and is not limited as such. For example, it is also possible that the image processing apparatus 100 does not include the display device 105 and the UI is displayed on an external display device.

The album creation application in the present embodiment is stored in the HDD 104. Then, as will be described later, the user selects the icon of the application that is displayed on the display device 105 with the pointing device 107 and provides a clicking or a double-clicking operation, or the like for the activation.

Figure 2:
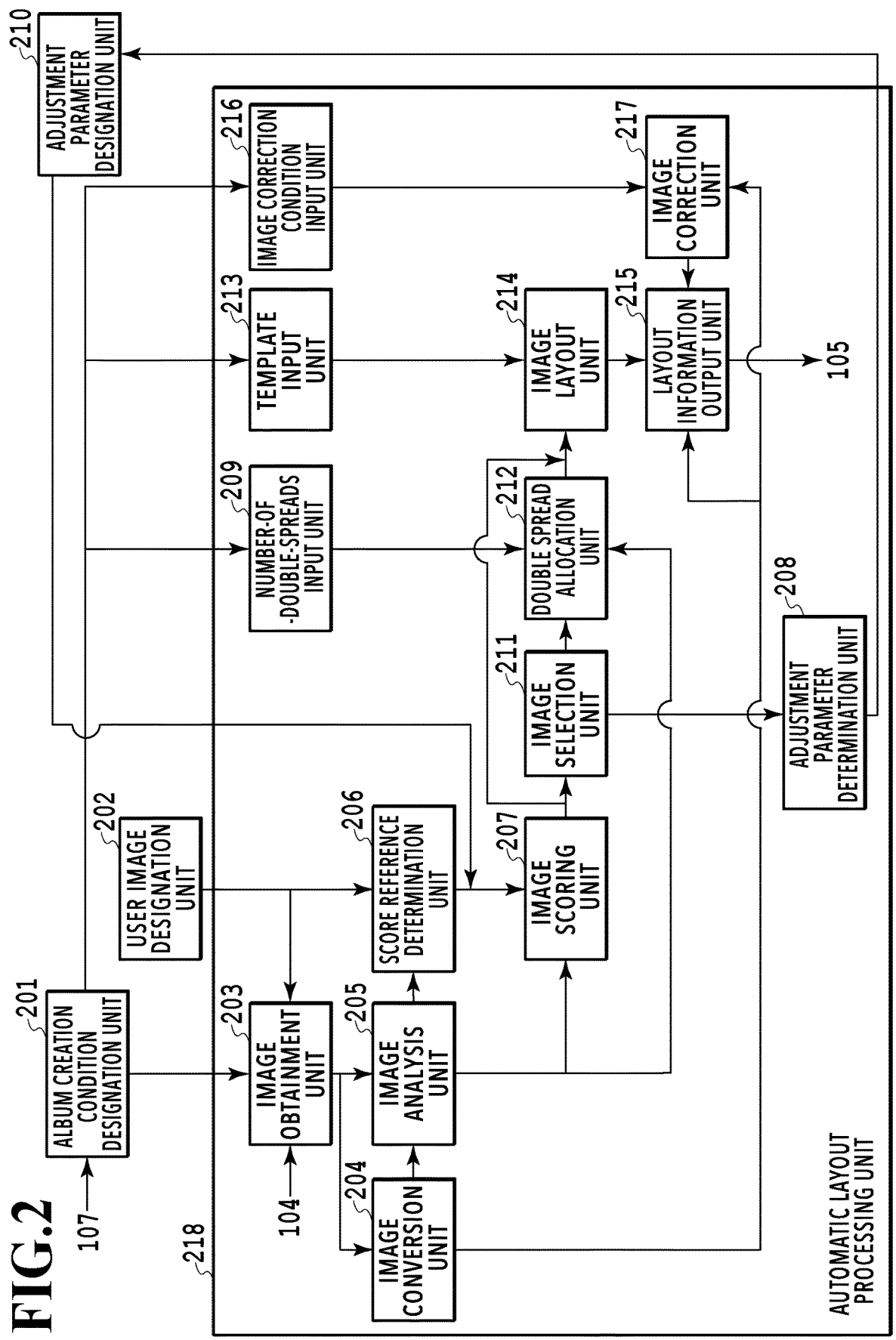
FIG. 2 is a software block diagram of an album creation application.

FIG. 2 is a software block diagram of the album creation application. The album creation application includes a album creation condition designation unit 201, a user image designation unit 202, a adjustment parameter designation unit 210, and a automatic layout processing unit 218. The automatic layout processing unit 218 includes the image obtainment unit 203, an image conversion unit 204, an image analysis unit 205, a score reference determination unit 206, an image scoring unit 207, an adjustment parameter determination unit 208, a number-of-double-spreads input unit 209, a image selection unit 211, a double spread allocation unit 212, a template input unit 213, an image layout unit 214, a layout information output unit 215, an image correction condition input unit 216, and the image correction unit 217.

Each program module corresponding to the respective constituent elements illustrated in FIG. 2 is included in the above-described album creation application. Further, if the CPU 101 executes each program module, the CPU 101 thereby functions as the respective constituent elements illustrated in FIG. 2. Hereafter, the explanation of the respective constituent elements illustrated in FIG. 2 will be given on the premise that the respective constituent elements execute various processing. Further, in FIG. 2, a software block diagram relating to the automatic layout processing unit 218 that executes the automatic layout function is illustrated in particular.

The album creation condition designation unit 201 designates an album creation condition for the automatic layout processing unit 218 according to the UI operation with the pointing device 107. In the present embodiment, as the album creation condition, it is possible to designate an album candidate image group including candidate images to be used for the album (also referred to as the first image group), the number of double spreads, the kind of template, and whether or not image correction is performed on the album. Further, it is possible to designate the product material for creating the album. The album candidate image group may be designated based on the attribute information or attachment information of individual images, such as the shooting dates and times, or may be designated based on the structure of the file system that includes images, such as a device and a directory. Further, it is also possible that two given images are to be designated, so that all the images captured between the dates and times at which the respective image data were captured will be set as the target image group. In the present specification, a "double spread" corresponds to one display window in the case of displaying, and, in the case of printed products, a "double spread" corresponds to a pair of pages adjacent to each other that can be viewed at one time by the user if the user opens the book (that is, corresponding to two pages). Regarding the two pages in a double spread, there are a case where a double spread is formed by adjacently biding pages that are respectively printed on different printing paper and a case where a double spread is formed by folding pages that are printed on one sheet of printing paper in the middle. The user image designation unit 202 allows the user to designate a user image group (also referred to as the second image group) desired to be adopted in the album, which represents the user's hobby or preference. As the user image group, one or more images can be selected. Further, it is also possible that the image groups used in the albums created in the past are saved in the HDD 104 or on the cloud that can be accessed via the data communication unit 108, so as to allow the user to perform designation from the image groups, in addition to the above-described designation method. The images designated here may or may not be included in the images designated by the album creation condition designation unit 201. That is, the user image group may or may not be included in the album candidate image group.

The image obtainment unit 203 obtains the image groups designated by the album creation condition designation unit 201 and the user image designation unit 202 from the HDD 104. As meta information, the image obtainment unit 203 outputs, to the image analysis unit 205, the following information included in an obtained image, i.e., the information of the width and the height of the image, the shooting date and time information included in Exif information at the time of image-capturing, the information indicating whether the image is included in the user image group, etc. Further, the image obtainment unit 203 outputs the obtained image data to the image conversion unit 204. Identification information is added to each image, and the meta information that is output to the image analysis unit 205 and the image data that is output to the image analysis unit 205 via the later-described image conversion unit 204 can be associated with each other by the image analysis unit 205.

Examples of images stored in the HDD 104 include still images and frame images that are cut out from a moving image. Still images and frame images are obtained from an image-capturing device such as a digital camera and a smart device. The image-capturing device may be included in the image processing apparatus 100 or may be included in an external device. In a case when the image-capturing device is an external device, images are obtained via the data communication unit 108. Further, the still images and cut-out images may be images obtained from a network or a server via the data communication unit 108. Examples of images obtained from a network or a server include social networking service images (hereafter referred to as "SNS images"). For each image, the program executed by the CPU 101 analyzes data attached to the image, so as to determine where the image is saved. It is also possible to obtain an image from an SNS via an application so that thereby the source of the SNS image is managed in the application. The images are not limited to the above-described images and may be another type of image.

The image conversion unit 204 converts the image data that is input from the image obtainment unit 203 into the pixel count and color information to be used by the image analysis unit 205 and outputs the pixel count and color information to the image analysis unit 205. In the present embodiment, images are converted into a predetermined pixel count, such as a size of which the short side is set to 420 pixels and the original ratio of the respective sides is maintained for the long side. Further, for analyzing the color, the conversion is performed in a unified manner into a color space such as sRGB. In this way, the image conversion unit 204 performs conversion into an analysis image having a unified pixel count and color space. The image conversion unit 204 outputs the converted image to the image analysis unit 205. Further, the image conversion unit 204 outputs the image to the layout information output unit 215 and the image correction unit 217.

The image analysis unit 205 analyzes the image data of an analysis image that is input from the image conversion unit 204 by the later-described method, in order to obtain image feature amounts. As the analysis process, each process of estimating the degree of focus, face detection, personal recognition, and object determination is executed, so that these image feature amounts are obtained. Other examples of the image feature amounts include a tint, brightness, resolution, data amount, degree of blurring/shaking, etc., although even other image feature amounts may be used. The image analysis unit 205 extracts and combines necessary information from meta information, which is input from the image obtainment unit 203, in order to output the necessary information as a feature amount to the score reference determination unit 206 together with the above-described image feature amounts. Further, the image analysis unit 205 also outputs the feature amounts of an analysis result to the image scoring unit 207. Further, the image analysis unit 205 outputs the shooting date and time information to the double spread allocation unit 212.

By use of the feature amounts of the user image group that is designated by the user image designation unit 202 from among the feature amounts obtained from the image analysis unit 205, the score reference determination unit 206 determines the score reference, which is used by the image scoring unit 207 to calculate a score in the later-described method, and provides the score reference to the image scoring unit 207. The herein-mentioned score is an index that is indicative of the appropriateness for layout of each image, and a higher score is indicative of being more suitable for layout. Further, the score reference is a reference for the image scoring unit 207 to calculate a score, and, by determining the score reference based on the feature amounts of the user image group, it is possible to select images in line with the user's intention.

The image scoring unit 207 scores each image of the album candidate image group by use of the score reference that is determined by the score reference determination unit 206, the adjustment parameters obtained from the adjustment parameter designation unit 210, and the feature amounts that are obtained from the image analysis unit 205. The result of scoring is output to the image selection unit 211 and the image layout unit 214.

The number-of-double-spreads input unit 209 inputs, to the double spread allocation unit 212, the number of double spreads of an album designated by the album creation condition designation unit 201. The number of double spreads in an album corresponds to the number of multiple templates in which multiple images are arranged.

The image selection unit 211 selects images, based on the scores that are calculated by the image scoring unit 207, creates a list of a layout image group (also referred to as the third image group) to be used for the album, and provides the list to the double spread allocation unit 212 and the adjustment parameter determination unit 208.

The double spread allocation unit 212 allocates each image of the image group, which is selected by the image selection unit 211, to the double spreads by use of the shooting date information. Although the example in which the allocation is performed on a per double spread basis is explained here, it is also possible that the allocation is performed on a per page basis.

The template input unit 213 reads, from the HDD 104, multiple templates according to the template information, which are designated by the album creation condition designation unit 201, and inputs the multiple templates to the image layout unit 214.

The image layout unit 214 performs the layout processing for images of each double spread. Specifically, for the processing-target double spread, a template suitable for the images selected by the image selection unit 211 is determined from among the multiple templates that are input by the template input unit 213, so that the layout of each image will be determined.

The layout information output unit 215 outputs layout information to be displayed on the display device 105 according to the layout which is determined by the image layout unit 214. For example, the layout information is bitmap data in which the data of the selected images, which are selected by the image selection unit 211, is laid out in the determined template.

The image correction condition input unit 216 provides the image correction unit 217 with ON/OFF information regarding image correction, which is designated by the album creation condition designation unit 201. Examples of the type of correction include luminance correction, dodging correction, red-eye correction, contrast correction, etc. ON or OFF of image correction may be designated for each type of correction or may be collectively designated for all types.

The image correction unit 217 performs correction on the layout information that is held by the layout information output unit 215, based on the image correction condition that is received by the image correction condition input unit 216. The pixel count of an image to be processed by the image conversion unit 204 and then by the image correction unit 217 can be changed according to the size of the layout image that is determined by the image layout unit 214. Although the image correction is performed to each image after generating a layout image in the present embodiment, there is no limitation as such, and it is also possible to perform the correction on each image before performing layout for a double spread or a page.

The adjustment parameter determination unit 208 determines an adjustment parameter from a selected image group, which is received from the image selection unit 211, and outputs the adjustment parameter to the adjustment parameter designation unit 210. The adjustment parameter is a parameter that the user can designate and is a parameter that can adjust a selection result of the image selection unit 211.

The adjustment parameter designation unit 210 uses adjustment parameters received from the adjustment parameter determination unit 208 as the initial values, and, by displaying the later-described UI screen (user interface screen) on the display device 105, allows the user to designate an adjustment parameter. The designated adjustment parameter is output to the image scoring unit 207. Accordingly, in a case where there is a deviation between the image group selected by the image selection unit 211 and the user's intention, it is possible for the user to adjust the score reference via the later-described UI screen, and, as a result, it is possible to select images again, based on the adjusted score reference.

If the album creation application is installed in the image processing apparatus 100, an activation icon is displayed on the top screen (desktop) of the OS (operating system) running on the image processing apparatus 100. If the user double-clicks the activation icon displayed on the display device 105 with the pointing device 107, the program for the app that is saved in the HDD 104 is loaded into the RAM 103 and executed by the CPU 101, so that the app is thereby activated.

Example of the Display Screen

Figure 3:
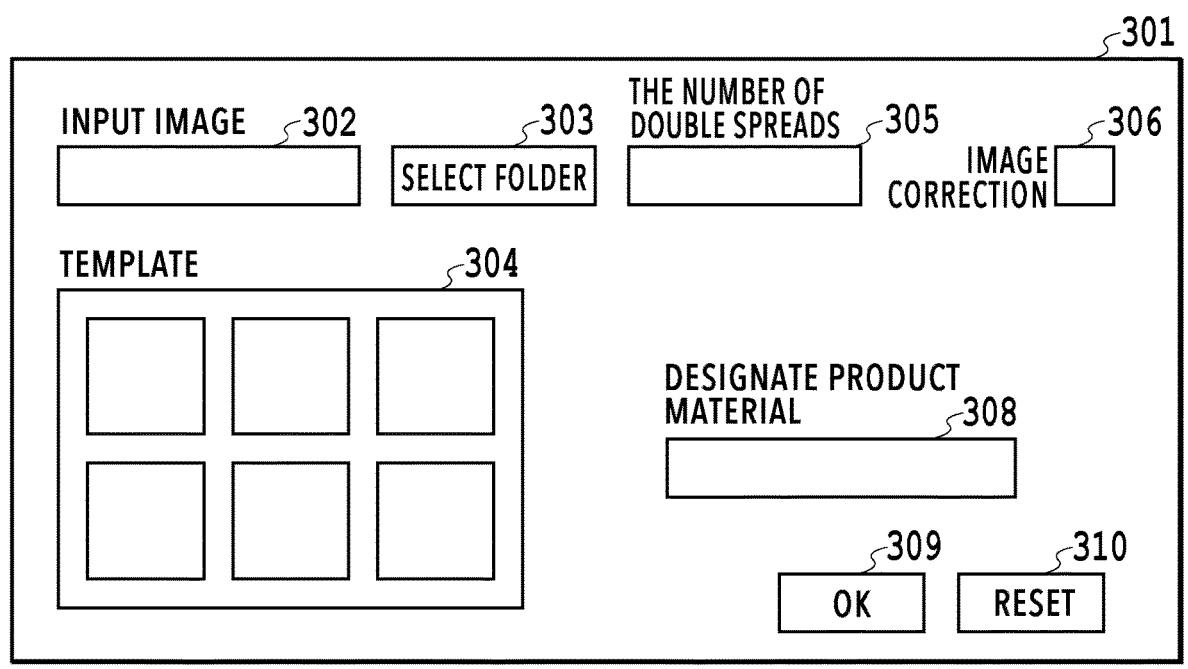
FIG. 3 is a diagram illustrating a display screen provided by the album creation application.

FIG. 3 is a diagram illustrating an example of the app activation screen 301 that is provided by the album creation application. The app activation screen 301 (the first screen) is displayed on the display device 105. The user sets the later-described album creation conditions via the app activation screen 301, and, through this UI screen, the album creation condition designation unit 201 obtains the setting contents that are set by the user.

In the path box 302 on the app activation screen 301, the storage location (path) of the multiple images (for example, multiple image files) to be the targets of album creation in the HDD 104 is displayed. If an instruction is given on the folder selection button 303 by a clicking operation with the pointing device 107 from the user, the folder selection screen that is installed as a standard in the OS will be displayed. On the folder selection screen, the folders which are set in the HDD 104 are displayed in a tree structure, so that the user can select a folder that includes the images to be the targets of album creation with the pointing device 107. The path of the folder in which the album candidate image group selected by the user is stored is displayed in the path box 302.

The template designation area 304 is an area for the user to designate template information, and the template information is displayed as an icon. In the template designation area 304, the icons of multiple template information are displayed side by side, so that the template information can be selected with clicking by the user using the pointing device 107.

The number-of-double-spreads box 305 accepts the setting of the number of double spreads in the album from the user. The user inputs a number directly into the number-of-double-spreads box 305 via the keyboard 106 or inputs a number from a list into the number-of-double-spreads box 305 with the pointing device 107.

The check box 306 accepts the user's designation of ON/OFF for image correction. The checked state is the state in which the image correction ON is designated, and the unchecked state is the state in which the image correction OFF is designated. Although all types of image correction are turned on or off with one button in the present embodiment, there is no limitation as such, and it is also possible that a check box is provided for each type of image correction.

The product material designation unit 308 is for setting the product material for the album to be created. As for the product material, it is possible to set the size of the album and the type of printing paper for the album. The type of printing paper and the type of the binding part may be individually set.

If the OK button 309 is pressed by the user, the album creation condition designation unit 201 outputs the contents that are set on the app activation screen 301 to the automatic layout processing unit 218 of the album creation application.

In that case, the path that is input in the path box 302 is transmitted to the image obtainment unit 203. The number of double spreads that is input in the number-of-double-spreads box 305 is transmitted to the number-of-double-spreads input unit 209. The template information that is selected in the template designation area 304 is transmitted to the template input unit 213. The ON/OFF of image correction in the check box for image correction is transmitted to the image correction condition input unit 216.

The reset button 310 on the display screen 301 is a button for resetting each of the setting information on the app activation screen 301.

Figure 4:
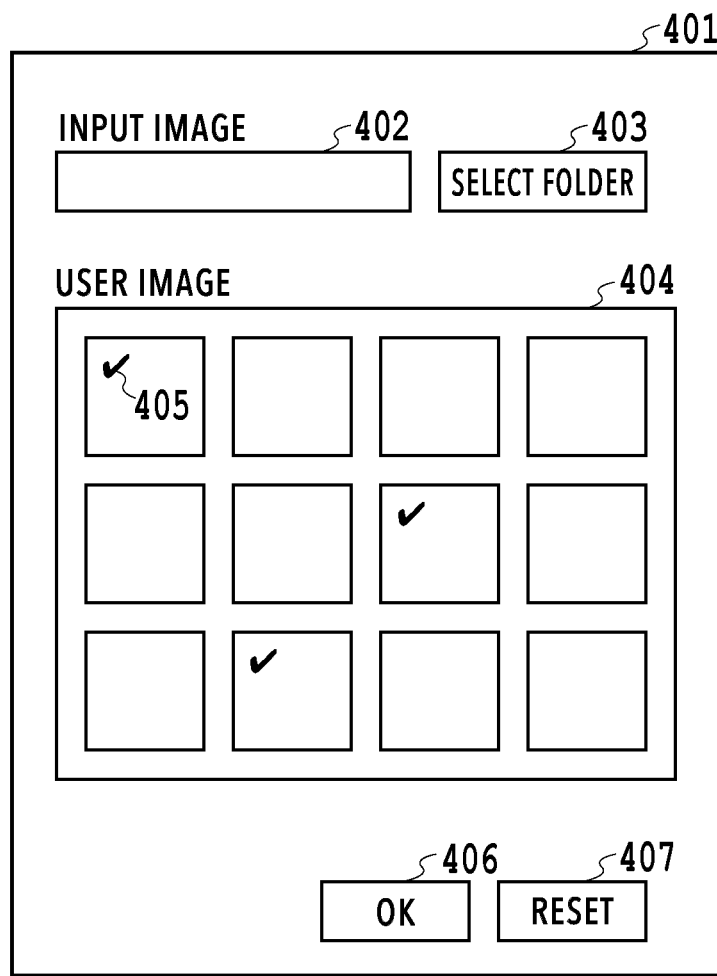
FIG. 4 is a diagram illustrating a display screen provided by the album creation application.

FIG. 4 is a diagram illustrating an example of the user image selection screen 401 provided by the album creation application. If the OK button 309 on the app activation screen 301 is pressed, the screen displayed on the display device 105 transitions to the user image selection screen 401 (the second screen). The user sets the user images via the user image selection screen 401, and the user image designation unit 202 obtains the setting contents that are set by the user. The user images are images that configure a user image group.

In the path box 402 on the user image selection screen 401, the storage location (path) of the multiple images (for example, multiple image files) to be the targets of user images in the HDD 104 is displayed. If an instruction is given on the folder selection button 403 by a clicking operation with the pointing device 107 from the user, the folder selection screen will be displayed. On the folder selection screen, the folders that are set in the HDD 104 are displayed in a tree structure, so that the user can select a folder that includes the images to be the targets of album creation with the pointing device 107. The folder path of the folder selected by the user is displayed in the path box 402. The same folder path as in the path box 302 may be displayed in the path box 402.

The user image designation area 404 is an area for the user to designate the user image, and multiple image files stored in the folder of the HDD 104 designated in the path box 402 are displayed as icons. In the user image designation area 404, the icons of multiple images are displayed side by side so as to be selectable with clicking by the user using the pointing device 107. In FIG. 4, it is indicated that the images marked with the check mark 405 are the images designated by the user. If selected by the user, the check mark 405 is added, and, if selected again in that state, the check mark 405 disappears.

If the OK button 406 is pressed by the user, the user image designation unit 202 obtains the contents that are set on the user image selection screen 401. The user image designation unit 202 outputs the obtained setting contents to the automatic layout processing unit 218 of the album creation application. At that time, the list of image files with the check mark 405 is transmitted to the image obtainment unit 203 as information of the user image group.

The reset button 407 on the user image selection screen 401 is a button for resetting each setting information on the user image selection screen 401.

Figure 5A:
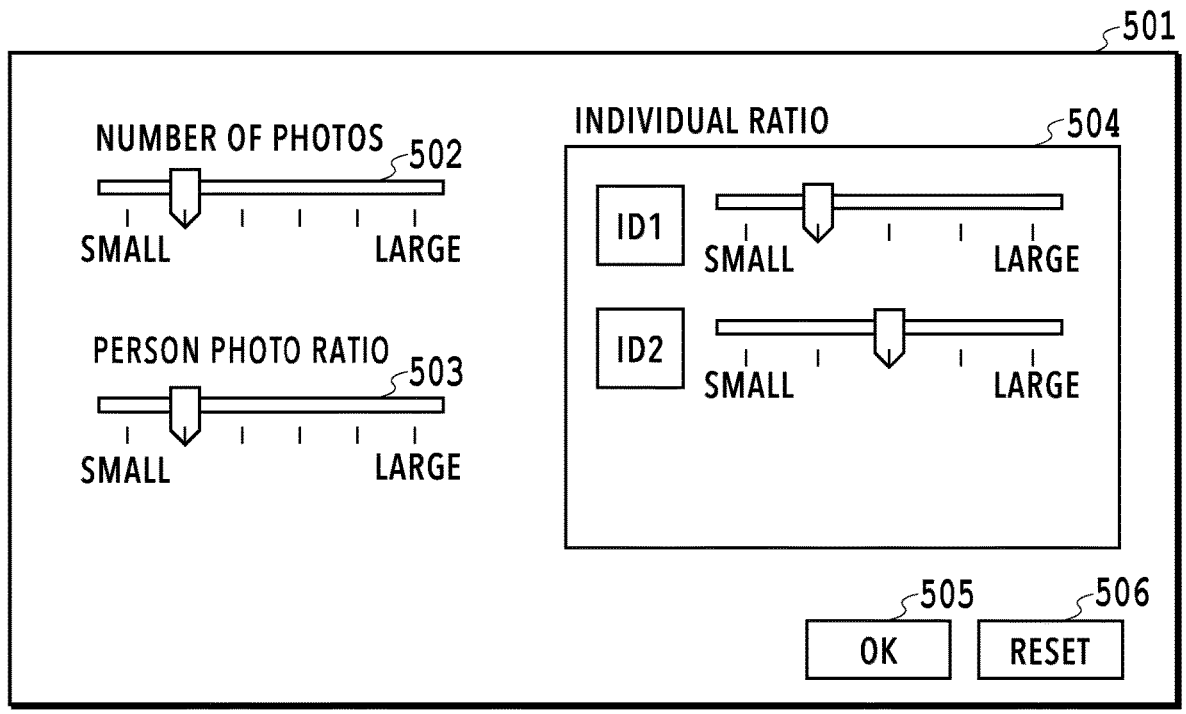
FIG. 5A and FIG. 5B are diagrams illustrating a display screen provided by the album creation application.
Figure 5B:
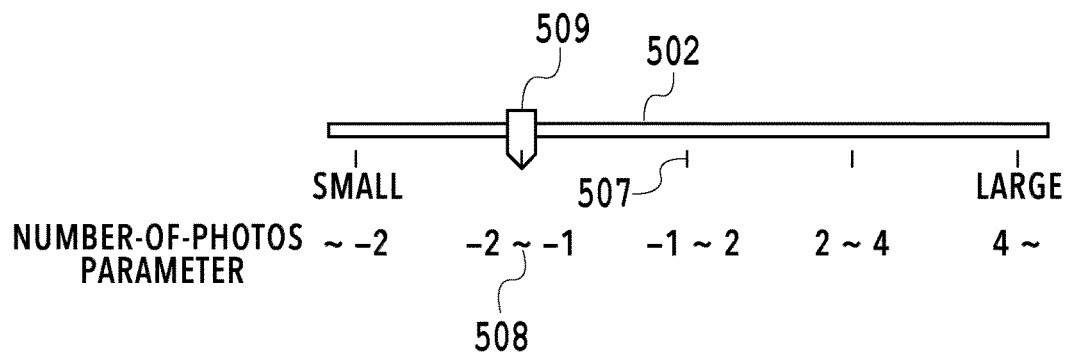

FIG. 5A and FIG. 5B are diagrams illustrating an example of the adjustment parameter designation screen provided by the album creation application. The adjustment parameter designation screen 501 (the third screen) will be explained with reference to FIG. 5A. The adjustment parameter designation screen 501 is displayed on the display device 105 if the user presses the image reselection button 1204 on the later-described layout confirmation screen (FIG. 12), for example. The user designates an adjustment parameter via the adjustment parameter designation screen 501, and the adjustment parameter designation unit 210 obtains the adjustment parameter designated by the user. Further, the user can confirm the initial values of the adjustment parameter designation screen 501 so as to confirm the appearance frequency of the automatically laid-out images, and the like.

The number-of-photos adjustment 502 is for adjusting the number of images to be arranged in the album with a slider bar. The user can adjust the number of images to be arranged in the album by moving the slider bar to the left or right. The person photo ratio 503 is for adjusting the ratio of photos with a person, which will be arranged in the album, with a slider bar. The individual ratio 504 is for adjusting the ratio of a specific person to be arranged in the album. Regarding a person, it is possible to adjust the number of images to be arranged in the album on a per person basis, based on a result of personal recognition from the analysis by the image analysis unit 205.

If the OK button 505 is pressed by the user, the adjustment parameter designation unit 210 obtains the contents that are set on the adjustment parameter designation screen 501. If the cancel button 506 is pressed, the adjustment parameter designation screen 501 is closed to end the adjustment parameter designation process. FIG. 5B will be described later.

<Processing Flow>

Figure 6:
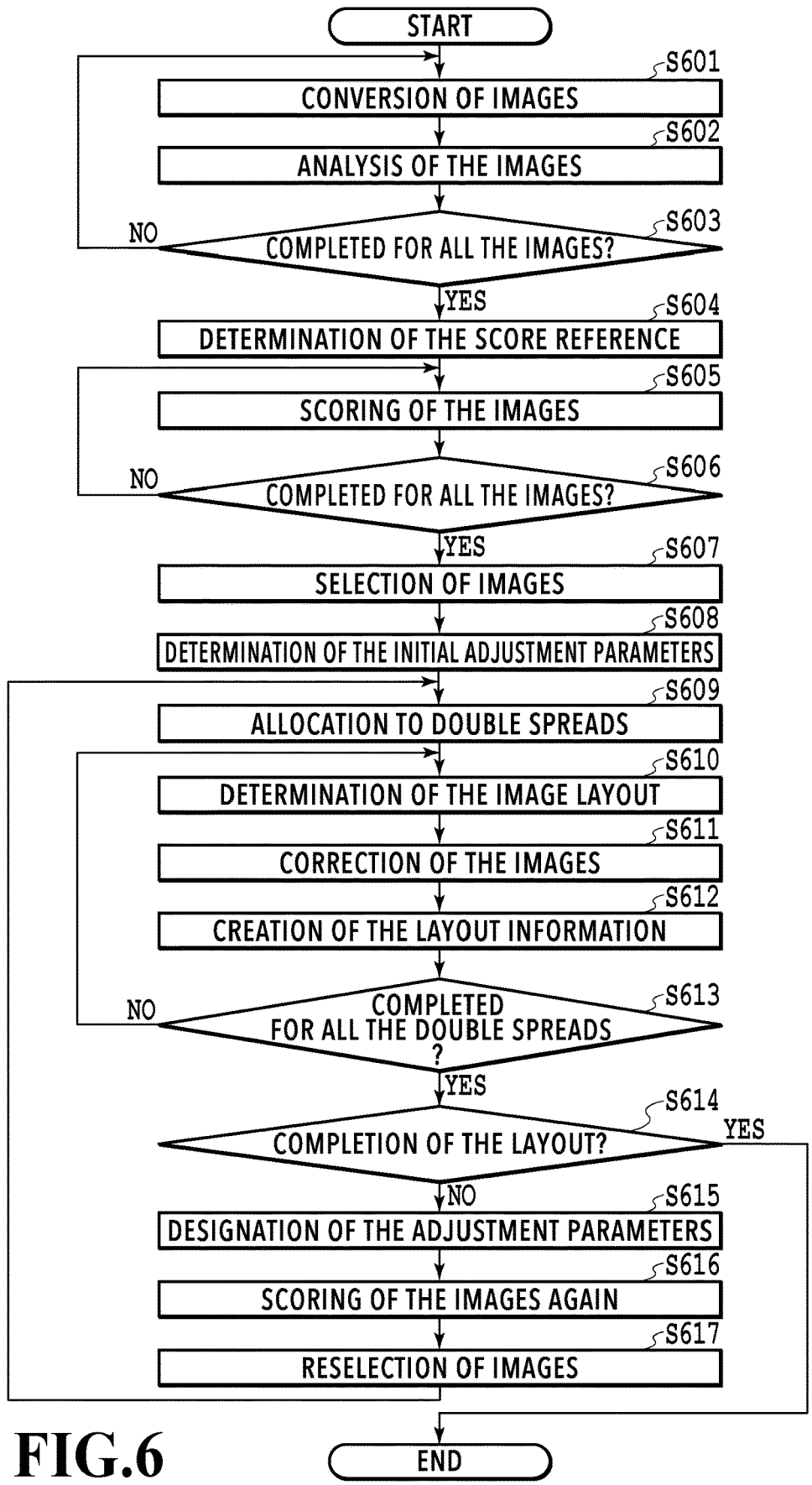
FIG. 6 is a flowchart illustrating automatic layout processing.

FIG. 6 is a flowchart illustrating the processing performed by the automatic layout processing unit 218 of the album creation application. For example, the flowchart illustrated in FIG. 6 is implemented by the CPU 101 reading out a program stored in the HDD 104 into the RAM 103 and executing the program. The explanation of FIG. 6 is given on the premise that the processing is performed by the respective constituent elements illustrated in FIG. 2, whose functions are achieved by the CPU 101 executing the above-described album creation application. With reference to FIG. 6, the automatic layout processing will be explained. The symbol "S" in the explanation of each process means that it is a step in the flowchart (the same applies hereafter to the present specification).

In S601, the image conversion unit 204 converts images to generate analysis images. At the point in time of S601, it is assumed that various kinds of settings have been completed through the UI screens, i.e., the app activation screen 301 and the user image selection screen 401. That is, it is assumed that the settings have been completed for the album creation condition, the album candidate image group, and the user image group. Specifically, in S601, the image conversion unit 204 specifies multiples image files stored in the folders of the HDD 104 that are designated by the album creation condition designation unit 201 and the user image designation unit 202. Further, the specified multiple image files are read out from the HDD 104 to the RAM 103. Then, the image conversion unit 204 converts the images of the read-out image files into analysis images, which have a predetermined pixel count and color information as described above. In the present embodiment, the conversion is performed to obtain analysis images of which the short side is 420 pixels and the color information is converted into sRGB.

In S602, the image analysis unit 205 executes the analysis process of the analysis images generated in S601 to obtain the feature amounts. Examples of the feature amounts include meta information that is stored in the images and image feature amounts that can be obtained by analyzing the images. In the present embodiment, although obtainment of the degree of focus, face detection, personal recognition, and object determination are executed as the analysis process, there is no limitation as such, and it is also possible to execute other analysis processes. Hereafter, details of the processing performed by the image analysis unit 205 in S602 will be explained.

The image analysis unit 205 extracts necessary meta information from the meta information received from the image obtainment unit 203. For example, from the Exif information attached to an image file that is read out from the HDD 104, the image analysis unit 205 obtains the shooting date and time as the time information of the image in the image file. As the meta information, for example, the position information of the image, the F value, etc., may be obtained. Further, as the meta information, information other than the information attached to the image file may be obtained. For example, schedule information associated with the shooting date and time of an image may be obtained.

Further, the image analysis unit 205 obtains image feature amounts from the analysis images generated in S601. Examples of the image feature amounts include the degree of focus. Detection of edges is performed as a method of obtaining the degree of focus. A Sobel filter is generally known as a method of detecting edges. Edge detection is performed with the Sobel filter, and the gradient of an edge is calculated by dividing the luminance difference between the start point and end point of the edge by the distance between the start point and end point. Based on the calculation result of the average gradient of the edges in an image, an image whose average gradient is large can be regarded as being in better focus than an image whose average gradient is small. Further, if multiple threshold values having different values are set for the gradient, it is possible to output an evaluation value of the in-focus degree by determining the threshold values that the gradient exceeds. In the present embodiment, two different threshold values are set in advance, so that the in-focus degree is determined in three stages, i.e., "DESIRABLE", "ACCEPTABLE", and "UNACCEPTABLE". For example, a focus gradient desired to be adopted for the album is determined as "DESIRABLE", an acceptable focus gradient is determined as "ACCEPTABLE", an unacceptable gradient is determined as "UNACCEPTABLE", and the respective threshold values are set in advance. For example, the setting of the threshold values may be provided by the creator of the album creation application, or the like, and it is also possible that the setting can be performed on a user interface. For example, as the image feature amounts, it is possible to obtain the brightness, tint, saturation, resolution, or the like, of an image.

The image analysis unit 205 executes face detection on the analysis images generated in S601. Here, a publicly-known method can be used for the face detection process. For example, AdaBoost, which creates a strong discriminator from multiple weak discriminators that are prepared, is used for the face detection process. In the present embodiment, the face image of a person (object) is detected by use of a strong discriminator created by AdaBoost. The image analysis unit 205 extracts a face image and obtains the upper left coordinate values and lower right coordinate values of the position of the detected face image. With these two kinds of coordinates, it is possible for the image analysis unit 205 to obtain the position of the face image and the size of the face image. Although the case in which an object is detected by use of AdaBoost has been explained here, it is also possible to perform the object detection by use of a trained model such as a neural network.

The image analysis unit 205 compares a face image, which is detected by the face detection in a processing-target image based on an analysis image, with the representative face images, which are saved for the respective individual IDs in the face dictionary database, so as to thereby perform personal recognition. Regarding the multiple representative face images, the image analysis unit 205 respectively obtains their similarities to the face image in the processing-target image. Further, the representative face image having the highest similarity is specified if the similarity is equal to or higher than a threshold value. Then, the individual ID corresponding to the specified representative face image is set as the ID of the face image in the processing-target image. Regarding the above-described multiple representative face images, in a case when their similarities to the face image of the processing-target image are all lower than the threshold value, the image analysis unit 205 sets the face image of the processing-target image as a new representative face image and registers the new representative face image in the face dictionary database in association with a new individual ID.

The image analysis unit 205 executes object recognition on the analysis images generated in S601. Here, a publicly-known method can be used for the object recognition process. In the present embodiment, objects are recognized by a determiner created by Deep Learning. The determiner outputs a likelihood of 0 to 1 for each object, and objects exceeding a given threshold value are recognized to be in the image. By recognizing an object image, the image analysis unit 205 can obtain the type of object, such as a pet including a dog, cat, or the like, a flower, food, a building, a figurine, and a landmark. Although objects are determined in the present embodiment, there is no limitation as such, and it is also possible to recognize a facial expression, a shooting composition, a scene such as a trip or a wedding ceremony, etc., so as to obtain the respective type. Further, it is also possible to utilize the likelihood itself that is output from the determiner before the determination is executed. In this way, the score reference determination unit 206 can determine the score reference with a greater degree of freedom.

FIG. 7 is a diagram illustrating feature amounts. As illustrated in FIG. 7, the image analysis unit 205 sorts the feature amounts obtained in S602 for each ID that identifies the respective image (analysis image) and stores the feature amounts in a storage area such as the ROM 102. For example, as illustrated in FIG. 7, the shooting date and time information, focus determination result, the number of detected face images, as well as the position information and similarity thereof, and the type of the recognized object, which are obtained in S602, are stored in a table format. The position information of the face images is stored for each individual ID obtained in S602. Further, in a case when multiple types of objects are recognized from one image, all of the multiple types of the objects are stored in the line corresponding to the one image in the table illustrated in FIG. 7.

In S603, whether or not the processes of S601 to S602 have been completed for all the images included in the album candidate image group and the user selection image group is determined. Here, if it is determined that the process has not been completed, the processes from S601 will be repeated. If it is determined that the process has been completed, the processing will proceed to S604. That is, by repeatedly executing the processes of S601 to S602 for all the images stored in the designated folder, the table illustrated in FIG. 7, which contains the respective information of all the images, is created.

In S604, the score reference determination unit 206 determines the score reference, based on the feature amounts obtained from the analysis results of the user images of the user image group. That is, the score reference to be used by the image scoring unit 207 is determined, based on the feature amounts corresponding to the image IDs of the user image group. The herein-mentioned score is an index indicative of the appropriateness for layout of each image. Further, the score reference is a reference for calculating a score in the image scoring unit 207 and is, for example, a formula or a score calculation algorithm that is configured with given coefficients. The score reference determination unit 206 generates control information to be used for the score reference, then determines the score reference based on the control information, and then provides the score reference to the image scoring unit 207. As a specific example, the control information is the average value and the standard deviation for each feature amount, as will be described later.

Figure 8:
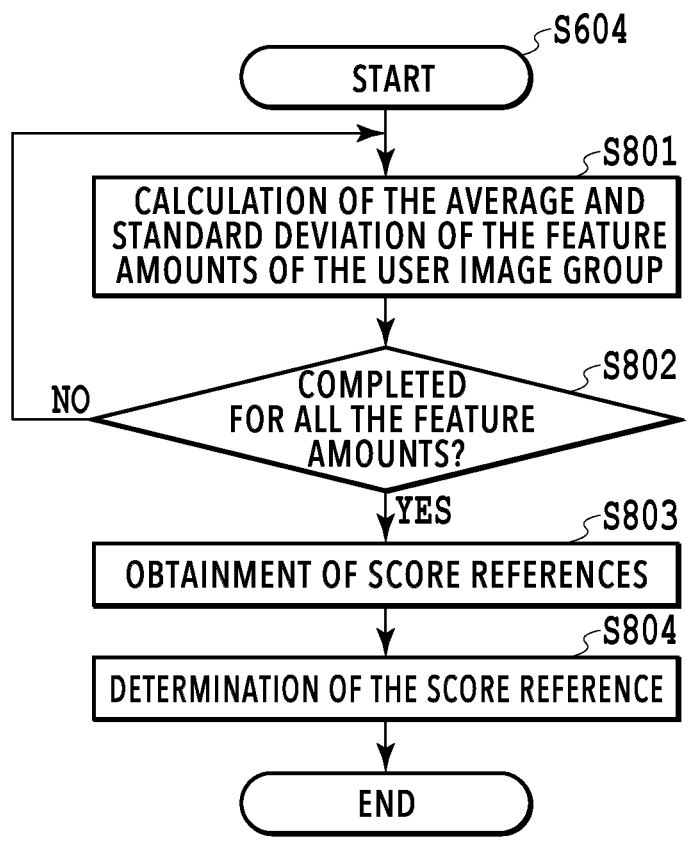
FIG. 8 is a flowchart illustrating the details of a score reference determination process.
Figure 9A:
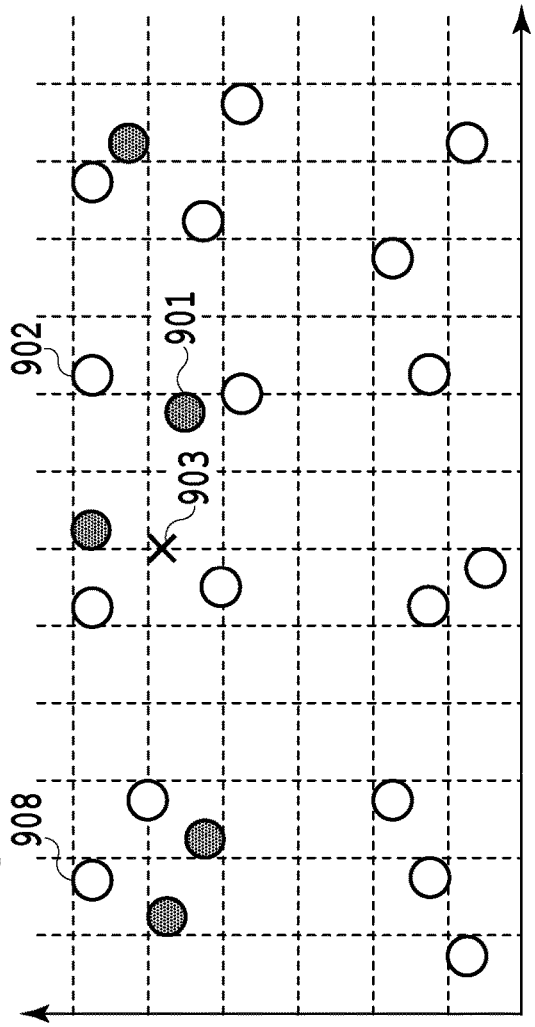
FIG. 9A through FIG. 9C are diagrams illustrating feature amounts in a feature amount space.
Figure 9B:
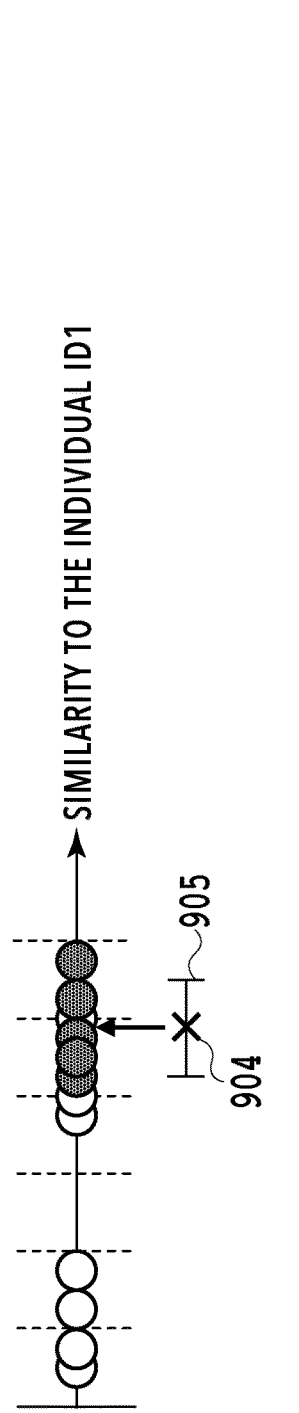
Figure 9C:
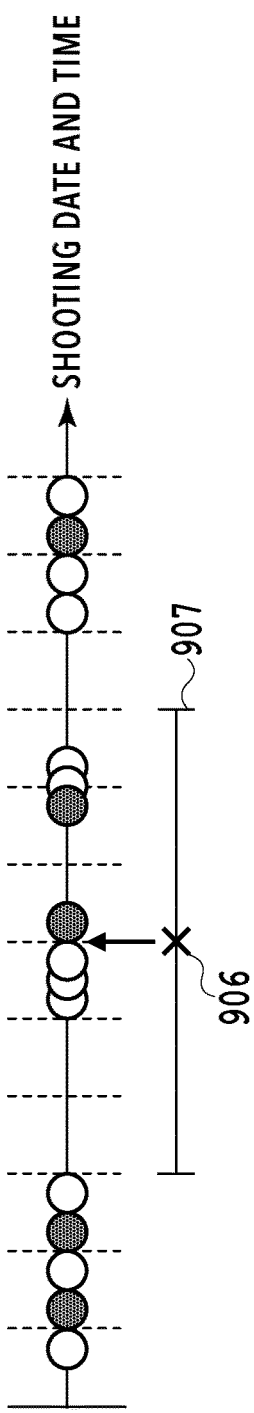

FIG. 8 is a flowchart illustrating the details of the score reference determination process of S604. FIG. 9A through FIG. 9C are diagrams illustrating feature amounts in a feature amount space. Hereafter, the score reference determination process performed in S604 will be explained with reference to FIG. 8 and FIG. 9A through FIG. 9C.

In S801, the score reference determination unit 206 calculates the average value and standard deviation of the user image group as control information for each feature amount. Hereafter, the control information will be explained with reference to FIG. 9A through FIG. 9C.

In FIG. 9A, the example in which the feature amount of each image is plotted on the feature amount space is illustrated. Since the feature amount space is multi-dimensional and it is not possible to illustrate all the feature amounts, the explanation will be given in FIG. 9A with the two extracted feature amounts, i.e., the similarity to the individual ID1 and the shooting time extracted from each feature amount. However, one-dimensional feature space using one feature amount is also possible. Further, the same processing is performed for other feature amounts. The shaded points such as the point 901 are indicative of the points where a feature amount corresponding to a user image is plotted. The unshaded points such as the point 902 are indicative of the points where a feature amount corresponding to an album candidate image is plotted. The point 903 indicated by "x" in the drawing is indicative of the average value vector, which is obtained from the feature amount vectors of the user image group.

In FIG. 9B, each image is plotted on the feature amount axis of similarity to the individual ID1. If the face of the individual ID1 is included in the image and the correlation to the person who is identified with the individual ID is higher, that is, if the probability of being the same person as the individual ID is higher, a larger value (in the right direction of the axis) is given. The point 904 is indicative of the average value of the user image group on this feature amount axis, and the width 905 is indicative of the standard deviation of the user image group on this feature amount axis. Since the respective user images have resembling features on the feature amount axis of similarity to the individual ID1 illustrated in FIG. 9B, the standard deviation 905 is small and the distribution is dense. That is, it can be seen that there is a high probability that the person of the individual ID1 is often included in all the images of the user image group.

In FIG. 9C, each image is plotted on the feature amount axis of shooting date and time. The point 906 is indicative of the average value of the user image group on this feature amount axis, and the width 907 is indicative of the standard deviation of the user image group on this feature amount axis. Since the respective user images have different features on the feature amount axis of the shooting date and time, the standard deviation 907 is large and the distribution is sparse. That is, it can be seen that the user image group includes images of various shooting dates and times.

In S802, it is determined whether or not the process of S801 has been completed for all the feature amount items. Here, if it is determined that the process has not been completed, the processes from S801 will be repeated. If it is determined that the process has been completed, the processing will proceed to S803.

In S803, the score reference determination unit 206 obtains the score references that are incorporated in the album creation application in advance. Then, in S804, the score reference is determined by use of the control information (in the present example, the average value and standard deviation for each feature amount) which is calculated in S801. More specifically, in the present embodiment, the below-explained formula (1) and formula (2) are obtained as the score references, and the score reference is determined by applying the control information (the average value and standard deviation for each feature amount), which is calculated in S801, to the formula (1). Thereafter, the processing proceeds to S605, so that the image scoring unit 207 performs the process of scoring the images of the album candidate image group. Hereafter, the examples of the score reference that is determined in S604 and the scoring process of S605 that follows will be explained together. In the present embodiment, in S605, the image scoring unit 207 first calculates the score for each image to be the target of scoring (referred to as the "attention image") as well as for each feature amount by use of the formula (1) using the control information which is calculated in S801. The image to be the target of scoring is an image of the album candidate image group.

$$Sji=(50-10\times|\mu i-fji|/\sigma i)/\sigma i \qquad (1)$$

Here, j is indicative of the index of the attention image, i is indicative of the index of the feature amount, fji is indicative of the feature amount of the attention image, Sji is indicative of the score corresponding to the feature amount fji, and μi and σi are respectively indicative of the average value and standard deviation of each feature amount of the user image group. That is, as for such feature amounts of which the standard deviation 905 of the user image group is small and the distribution is dense as in FIG. 9B, the feature amounts of the attention images that are close to the average value are scored higher than the feature amounts that are far from the average value. On the other hand, as for such feature amounts of which the standard deviation 907 of the user image group is large and the distribution is sparse as in FIG. 9C, there is not much difference among the scores of the feature amounts of the attention images that are close to the average value and the feature amounts that are far from the average value, relatively, compared with the case of FIG. 9B.

Then, in S605, the image scoring unit 207 calculates the score of each attention image by use of the score Sji for each attention image as well as for each feature amount, which is obtained by the formula (1), and the formula (2).

$$Pj=\Sigma i(Sji)/Ni \qquad (2)$$

Here, Pj is indicative of the score of each attention image, and Ni is indicative of the number of items of the feature amounts. That is, the score of each attention image is calculated as the average of the scores of the respective feature amounts. In this way, in S804, the score reference determination unit 206 determines the formula (1) and formula (2) as the score references. Thereafter, in S605, the image scoring unit 207 scores each attention image by application of formula (1) and formula (2) as described above.

Here, since it is preferable that the images used for the album are in focus, it is also possible to add a predetermined score to the attention images whose feature amount of focus illustrated in FIG. 9A through FIG. 9C is "DESIRABLE". Further, it is also possible to add a predetermined score to the attention images having a certain object. For example, in a case when many images including animals are desired to be selected, it is possible to perform such a control in which a predetermined score is added to the attention images including an object belonging to animals so that the attention images will be preferentially selected.

According to the score references above, as for a feature amount of which the standard deviation σ is small such as the similarity to the individual ID1 in FIG. 9B, the score to be calculated by the formula (1) becomes higher for the attention images having features resembling the user image group more. Therefore, as for the similarity to the individual ID1, which is a feature amount whose distribution is dense in the user image group, the attention images having features resembling the user image group are scored higher so as to be more likely to be selected.

On the other hand, as for a feature amount of which the standard deviation σ is large such as the shooting date and time in FIG. 9B, the score to be calculated by the formula (1) is small regardless of the difference between the average value μ and the feature amount fji of the attention image. Therefore, regarding the shooting date and time, which is a feature amount that is sparsely distributed in the user image group, the effect on the image selection is small regardless of the features of the attention images.

In this way, by use of the score references of the present embodiment, images having features common to the user image group are selected from the album candidate image group, so that images with a unified impression can be selected as the layout image group.

Although the formula (2) is used as a score reference for calculating the score of each attention image in the present embodiment, there is no limitation as such, and, for example, it is also possible that weight addition with the formula (3) is performed on the score of each feature amount calculated by the formula (1).

$$Pj=\Sigma i(wi \times Sji)/Ni \qquad (3)$$

Here, wi is a weight coefficient for each feature amount. Accordingly, it is possible to change the degree of effect (contribution ratio) that each feature amount has on the score of the attention image. For example, in FIG. 9A through FIG. 9C, by increasing the contribution ratio for the similarity to the individual ID1 and decreasing the weight contribution ratio for the shooting date and time, it is possible to perform scoring with a greater emphasis on the similarity to the individual ID1.

Further, it is also possible to use such a score reference to set the largest score as the score of the attention image, from among the scores of the respective feature amounts that are calculated by the formula (1). Accordingly, a high score can be given in a case when, of the respective feature amounts, one or more feature amounts have features resembling the user image group. For example, in FIG. 9A through FIG. 9C, it is possible to give a high score to the attention image even in a case when the feature amounts other than the similarity of the attention image to the individual ID1 have different features from the user image group, such as the shooting date and time.

Further, it is also possible to use such a score reference to calculate the score of the attention image, based on the difference between the average vector of the user image group and the vector of the attention image in a multi-dimensional feature amount space. Accordingly, it is possible to perform scoring in comprehensive view of all the feature amounts. For example, in FIG. 9A, since the album candidate image 902 has a feature resembling the average value vector 903 in the multi-dimensional space, a high score will be given to the album candidate image 902. On the other hand, since the album candidate image 908 has a feature different from the average value vector 903 in the multi-dimensional space, a high score is not given to the album candidate image 908. That is, it is possible to perform such control in which a high score is not given in a case when one or more feature amounts have features different from the average value vector 903 of the user image group.

Although the score reference is determined by use of the average and standard deviation of each feature amount of the user image group in the present embodiment, there is no limitation as such, and, for example, it is also possible to determine a score reference that uses each feature amount of the user image group and the standard deviation thereof as in the formula (4).

$$Sji=\Sigma k(50-10 \times |fki-fji|/\sigma i)/(\sigma i \times Nk) \qquad (4)$$

Here, k is indicative of the index of a user image, fki is indicative of the feature amount of the user image, and Nk is indicative of the number of images included in the user image group. In this way, by comparing the feature amount of the attention image with the feature amount of each user image, the difference between the feature amounts of the attention image and the user image group can be evaluated more accurately.

Although the average value and standard deviation of the feature amounts of the user image group are used as the control information in the present embodiment, there is no limitation as such, and it is also possible to use the median value of the feature amount, the distribution shape (normal distribution, Poisson distribution, etc.), the interquartile range, the interquartile deviation, or the like. For example, the median value and standard deviation of the feature amounts of the user image group may be used, or the average value and the interquartile deviation of the feature amounts of the user image group may be used. That is, at least one of the average value and the median value of the feature amounts of the user image group and at least one of the standard deviation, the interquartile deviation, and the distribution shape may be used.

Referring to FIG. 6 again, in S605, which follows S604, the image scoring unit 207 obtains the score references that are determined by the score reference determination unit 206. That is, as described above, the formulas illustrated in the formulas (1) to (4) are obtained as the score references. Further, the image scoring unit 207 executes scoring on each image of the album candidate image group, based on the obtained score references. Scoring is to give a score for each image. The given scores are provided to the image selection unit 211 and are referred to at the time of selecting images to be used in the layout, which will be described later.

In S606, the image scoring unit 207 determines whether or not the scoring of S605 has been completed for all the images of the album candidate image group in the folder designated by the user. If it is determined that the scoring has not been completed, the processes from S605 will be repeated. If it is determined that the scoring has been completed, the processing proceeds to S607.

In S607, the image selection unit 211 selects the images to be laid out, based on the scores of the respective images, which are calculated by the image scoring unit 207. Hereafter, the selected image group is referred to as a layout image group.

In the present embodiment, the user image group is selected as the image group of which the images will all be laid out. Then, the image selection unit 211 selects images with high scores, which are given by the image scoring unit 207, from the image group designated by the album creation condition designation unit 201.

By executing the above-described method in the score reference determination unit 206 and the image scoring unit 207, images having features resembling the user image group will be selected in the selection of the image selection unit 211.

Figure 10A:
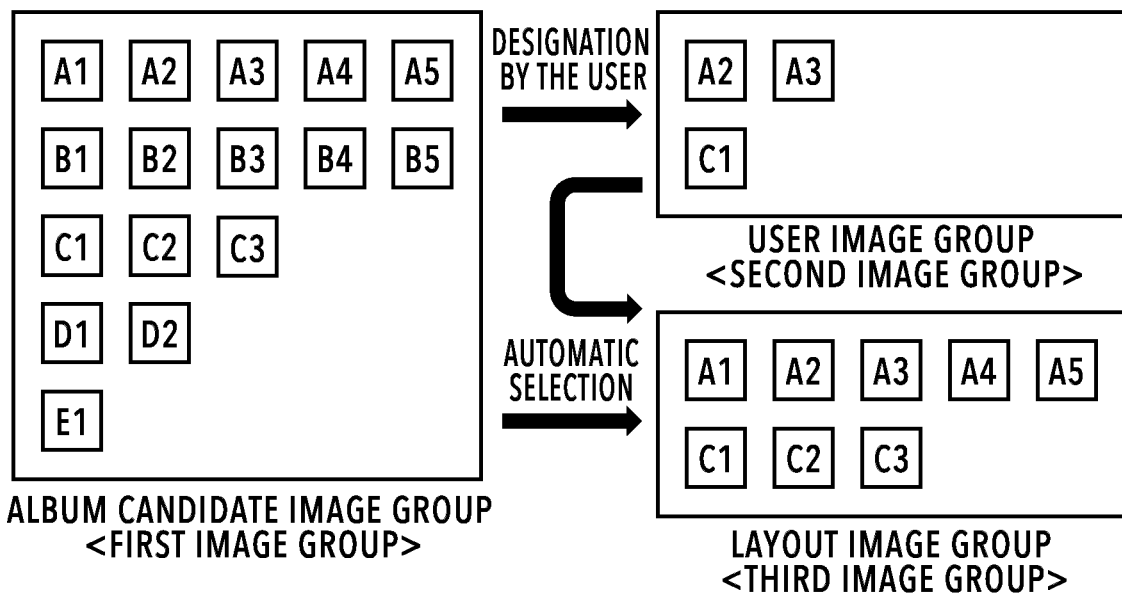
FIG. 10A and FIG. 10B are diagrams illustrating a result of image selection.
Figure 10B:
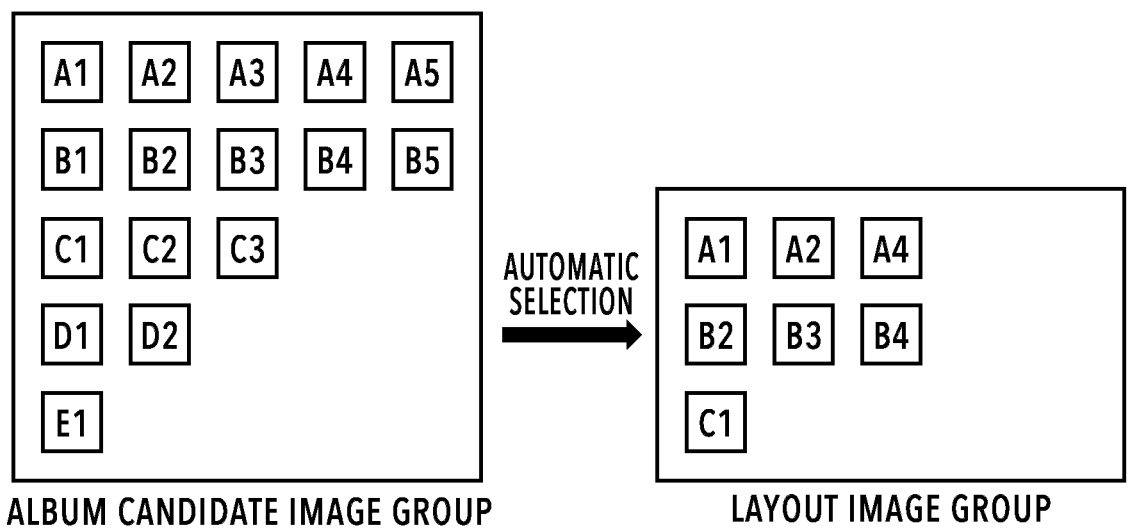

FIG. 10A and FIG. 10B are diagrams illustrating an example of an image selection result. In FIG. 10A, an example of the image selection result in the present embodiment is illustrated. In FIG. 10B, as a comparative example, an example of the image selection result in a case when the present embodiment is not used is illustrated. First, the explanation will be given with reference to FIG. 10A. For the sake of explanation, in each image, the feature amount with the highest score is noted for the different feature amounts A through E. In FIG. 10A, for the album candidate image group having different features from A to E, the user image designation unit 202 designates the images having the features A and C as the user image group. Then, the image selection unit 211 selects images having the features A and C as the layout image group. In this way, the user's intention can be grasped from the user image group and reflected in the image selection. On the other hand, an example of the image selection result in a case when a user selection image does not exist is illustrated in FIG. 10B. In this case, since the images are selected based on the tendency of the feature amounts of the entire album candidate image group, a large number of images having the feature A or the feature B, which are included in a large number of images, will be selected as a result. Further, in the case of FIG. 10B, even if there is an image designated by the user as in FIG. 10A, in a case when images are automatically selected from the album candidate image group, the images will be selected based on the tendency of the feature amounts of the entire album candidate image group after all. Therefore, a large number of images having the feature A or the feature B, which are included in a large number of images, will be selected as a result.

In the image selection process of S607, images having scores equal to or higher than a given threshold value are selected. This threshold value may be incorporated in the application program in advance, may be set in the application, or may be set dynamically from an image group. To set dynamically from an image group, for example, there is a method of finding such a threshold value with which 20% of the total number of images in the image group will be selected. Further, by setting a lower limit value for the number of images to be selected, the number of images to be selected can be adjusted so that at least one image can be laid out per double spread, for example.

Figure 12:
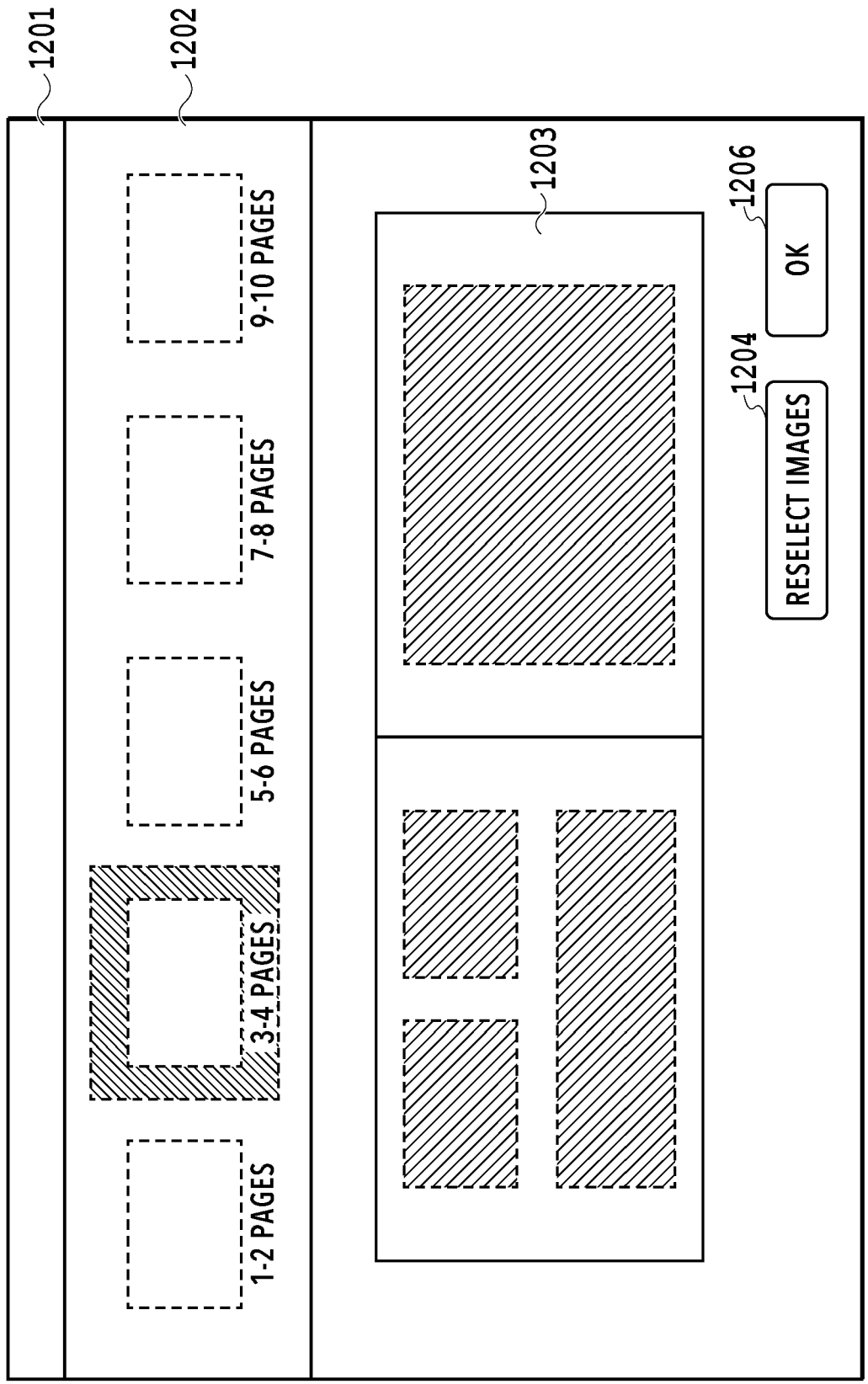
FIG. 12 is a diagram illustrating a display screen provided by the album creation application.

As a method of image selection, the selection may be performed with probability such that a higher selection probability is set for a higher score. By performing the selection with probability in this way, it is possible to change the layout images each time the automatic layout function is executed by the automatic layout processing unit 218. For example, in a case when the user is not satisfied with an automatic layout result, it is possible for the user to obtain a layout result different from the previous one by pressing the image reselection button 1204 on the later-described layout confirmation screen (FIG. 12).

Further, it is also possible that the image selection unit 211 does not select any layout image from the user image group, so that images to be laid out will be selected from the image group that is designated by the album creation condition designation unit 201. According to this method, since the user image designation unit 202 designates an image that is not desired to be included in the album, but has an ideal composition or arrangement of the subjects, it is possible to search for and select images resembling the ideal.

Further, it is also possible that images to be laid out are selected from the image group combining the image data group designated by the album creation condition designation unit 201 and the user images. According to this method, there is a possibility that images that are more suitable for the layout than the images in the user image group will be searched and selected. In this case, the image scoring unit 207 scores not only the album candidate image group but also the user image group.

In S608, the adjustment parameter determination unit 208 determines the adjustment parameters based on the image group selected in S607 and sends the adjustment parameters to the adjustment parameter designation unit 210. The adjustment parameter designation unit 210 has the received adjustment parameters as the initial values and sets the values on the above-described adjustment parameter designation screen 501 explained in FIG. 5A and FIG. 5B. Hereafter, with reference to FIG. 5A and FIG. 5B, the process of S608 will be explained. In the present embodiment, an explanation will be given with the respective examples of the number of photos 502, the person photo ratio 503, and the individual ratio 504 as the adjustment parameters.

The number of photos 502 is a parameter representing the number of photos to be arranged in the album, that is, the excess or deficiency of the number of images in the layout image group. Specifically, the adjustment parameter determination unit 208 finds a number-of-photos parameter by the formula (5).

Number-of-photos parameter=Number of images in layout image group/Number of double spreads− Basic number of photos (5)

Here, the basic number of photos is the standard number of images to be arranged in one double spread and, for example, is four. The basic number of photos is incorporated in the application in advance. The adjustment parameter designation unit 210 sets the initial value of the number of photos 502, based on the received number-of-photos parameter. For example, in a case when there are twenty-eight images in the layout image group and the number of double spreads is "4", the number-of-photos parameter is "3". This parameter indicates that the current number of photos (the number of images in the layout image group) is slightly larger than the standard number of images.

FIG. 5B is a diagram for explaining a method of associating the number of photos 502 and the number-of-photos parameter. In the present embodiment, the slider bar has the scale marks 507 with five steps. Further, the ranges 508 of the number-of-photos parameter corresponding to the respective scale marks 507 are defined. The adjustment parameter designation unit 210 presents the number-of-photos parameter to the user by setting the cursor 509 to the position of the scale mark corresponding to the received number-of-photos parameter. Accordingly, it is possible for the user to know whether the images of the layout image group selected by the image selection unit 211 are too many or too few for the album. The ranges 508 of the photo parameter may be incorporated in the application in advance or may be dynamically set based on the upper limit number of photos that can be arranged in one double spread and the basic number of photos.

Regarding the above-described formula (5), although the explanation was given of the example in which the excess or deficiency relative to the standard number of images to be arranged in one double spread is found as the number-of-photos parameter, there is no limitation as such. For example, it is also possible that the excess or deficiency of the number of images in the layout image group relative to the album candidate image group, which is set by the album creation condition designation unit 201, is found as the number-of-photos parameter. In this case, for example, the number-of-photos parameter is found by the formula (6)

Number-of-photos parameter=Number of images in layout image group/Number of images in album candidate image group×100 (6)

By using the number-of-photos parameter that is found by the formula (6), it is possible for the user to know about how many percentage of images of the album candidate image group were chosen as the layout image group. Although the adjustment parameter designation unit 210 converts the number-of-photos parameter into the slider bar of the number of photos 502 in the present embodiment, there is no limitation as such. It is also possible that the number of photos 502 is directly associated with the number of images in the layout image group or that a numerical number is directly displayed and input without a slider bar.

The person photo ratio 503 is a parameter representing the ratio of the photos with a person to the layout image group. Specifically, the adjustment parameter determination unit 208 finds the person photo ratio parameter by the formula (7).

Person photo ratio parameter=Number of person photos/Number of images in layout image group    (7)

Here, the number of person photos is the number of images with one or more faces, which are analyzed in the layout image group by the image analysis unit 205. As with the number of photos 502, the adjustment parameter designation unit 210 allocates the person photo ratio parameter, which is received from the adjustment parameter determination unit 208, to the slider bar of the person photo ratio 503. Here, although the proportion of the number of person photos to the number of images in the layout image group is set as the person photo ratio parameter, it is also possible that the proportion of the number of person photos used in the album candidate image group is set as the person photo ratio parameter.

The individual ratio 504 is a parameter representing the ratio of the photos with each person in the layout image group. Specifically, the adjustment parameter determination unit 208 finds the individual ratio parameter by the formula (8).

Individual ratio parameter $k$=Number of photos of individual $IDk$/Number of person photos    (8)

Here, k represents the index of an individual ID. The number of photos of the individual IDK is the number of images which are analyzed by the image analysis unit 205 and in which the individual IDk is recorded in the layout image group. As with the number of photos 502, the adjustment parameter designation unit 210 allocates the individual ratio parameter k, which is received from the adjustment parameter determination unit 208, to the slider bar of the individual ratio 504. The slider bar of the individual ratio 504 may be created as many as the number of individual IDs or may be created only for the individual IDs that are detected a number of times equal to or more than a given threshold value. Further, it is also possible that the adjustment parameter designation unit 210 displays, next to a slider bar, a representative face image of the individual ID corresponding to the slider bar.

With these adjustment parameters, the characteristics of the layout image group can be presented to the user. Although on explanation was given with the examples of the number of photos, the person photo ratio, and the individual ratio as the adjustment parameters in the present embodiment, there is no limitation as such. For example, by use of a result of object recognition, it is also possible to use elements other than a person, such as the ratio of photos of animals or ratio of photos of flowers, or to designate the tint of images. Further, it is also possible to display shooting positions on a map by use of position information included in the meta information of images, so that the importance levels of the shooting positions can be designated. The above is the explanation of the process of determining the initial adjustment parameters in S608.

The initial adjustment parameters that are determined as described above are displayed on the adjustment parameter designation screen 501 illustrated in FIG. 5A and FIG. 5B. Further, if the OK button 505 is pressed, the processing proceeds to S609. Since the initial adjustment parameters are not changed at the point in time of S608, it is possible that the OK button 505 and the cancel button 506 are not displayed, so that the processing proceeds to S609 in a state when the adjustment parameter designation screen 501 is displayed for a predetermined time period. Further, it is also possible that the processing is proceeded to the creation of the layout information in S612, which will be described later. After the creation of the layout information is completed, it is also possible that the adjustment parameter designation screen 501 transitions to the later-described layout confirmation screen (FIG. 12), which is for confirming the layout.

Alternatively, it is also possible that the initial adjustment parameters, which are determined in S608, are not presented to the user at the point in time of the determination of the initial adjustment parameters in S608. It is also possible that the adjustment parameters are presented to the user thereafter together with the layout confirmation screen (FIG. 12) that is displayed as a result of the later-described process of S612. Further, in the present example, although the explanation of the processing is given on the assumption that the user does not change the adjustment parameters on the adjustment parameter designation screen 501 in S608, it is also possible that adjustment parameters are designated by the user at the time when the initial adjustment parameters are presented in S608. In this case, after S608, the processing proceeds to S615, which will be described later.

Returning to FIG. 6, the explanation will be continued. For the allocation in S609, the double spread allocation unit 212 divides the layout image group obtained in S607 to the image groups corresponding to the number of double spreads, which is input by the number-of-double-spreads input unit 209. In the present embodiment, the layout images are aligned in the order of the shooting times obtained in S602 and divided at a section where the time difference of the shooting times of adjacent images is large. Such processing is performed until the division is done for the number of double spreads that is input from the number-of-double-spreads input unit 209. That is, the division is performed "(Number of double spreads−1)" times. Accordingly, it is possible to create an album in which images are arranged in the order of the shooting dates and times. It is also possible that the process of S609 is performed on a per page basis, not on a per double spread basis.

In S610, the image layout unit 214 determines the image layout. Hereafter, the example in which the template input unit 213 inputs FIG. 11A through FIG. 11P to given double spreads according to the designated template information will be explained.

FIG. 11A through FIG. 11Q are diagrams illustrating a template group to be used for layout of image data. The multiple templates included in the template group correspond to the respective double spreads. The template 1101 is one template. The template 1101 includes the main-slot 1102, the sub-slot 1103, and the sub-slot 1104. The main-slot 1102 is a main slot (frame for laying out an image) in the template 1101 and is larger in size than the sub-slot 1103 and the sub-slot 1104.

Here, the number of slots of the input template is designated as three as an example. It is assumed that, if the three selected images are arranged in the portrait direction or the landscape direction according to the shooting dates and times, the orientations thereof are as illustrated in FIG. 11Q.

Here, in each image group allocated to a double spread, the image whose score calculated by the image scoring unit 207 is the highest is set to the main-slot, and the other images are set to the sub-slots. Whether an image is for the main-slot or the sub-slots may be set based on a given feature amount obtained by the image analysis unit or may be set randomly. Further, the user selection images may be preferentially set to the main-slot.

Here, it is assumed that the image data 1105 is for the main-slot and the image data 1106 and 1107 are for the sub-slots. In the present embodiment, image data with an earlier shooting date and time is laid out at the upper left of the template and an image with a later shooting date and time is laid out at the lower right of the template. In FIG. 11Q, since the image data 1105 for the main-slot has the latest shooting date and time, the templates of FIG. 11I through FIG. 11L will be the candidates. Further, since the earlier one of the image data 1106 for a sub-slot is a portrait image and the later one of the image data 1107 is a landscape image, it will be determined as a result that the template of FIG. 11J is the most suitable for the selected three image data, so that the layout is determined. In S610, which images are laid out in which slots of which template are determined.

In S611, the image correction unit 217 executes image correction. The image correction unit 217 executes image correction in a case when the information indicating that the image correction is ON is input from the image correction condition input unit 216. As the image correction, for example, dodging correction (luminance correction), red-eye correction, or contrast correction will be executed. The image correction unit 217 does not execute image correction in a case when the information indicating that the image correction is OFF is input from the image correction condition input unit 216. For example, the image correction can also be performed on image data whose size of the short side has been converted into 1200 pixels in the sRGB color space.

In S612, the layout information output unit 215 creates layout information. The image layout unit 214 lays out the image data, on which the image correction of S611 has been executed, to the respective slots of the template determined in S610. Here, the image layout unit 214 scales the image data to be laid out according to the size information of the slot and lays out the image data. Then, the layout information output unit 215 generates the bitmap data in which the image data is laid out in the template as the output image data.

In S613, the image layout unit 214 determines whether or not the processes of S610 to S612 have been completed for all the double spreads. If it is determined that the processes have not been completed, the processes from S610 will be repeated. If it is determined that the processes have been completed, the processing transitions to S614.

In S614, the automatic layout processing unit 218 determines whether or not to recreate the layout information that is created in the processes of S609 to S613. That is, whether or not the layout process is completed is determined. In a case when it is determined that the layout process is not completed (that is, the layout information will be recreated), the processing proceeds to S615. In a case when it is determined that the layout process is completed, the automatic layout processing of FIG. 6 is ended. The determination of whether or not to recreate the layout information is determined based on whether or not the image reselection button on the layout confirmation screen is pressed by the user, for example.

FIG. 12 is a diagram illustrating an example of the layout confirmation screen. On the layout confirmation screen 1201 (the fourth screen), the thumbnail display region 1202 for displaying thumbnails of the respective double spreads of the photo album is provided at the upper part, and a display region for the photo album 1203, which is a layout image, is provided at the lower part. In this way, on the layout confirmation screen 1201, the layout information output unit 215 displays the bitmap data (output image data) including the images laid out in the template, which is generated in S612, on the display device 105. Therefore, it is possible for the user to confirm the layout result. If the user presses the image reselection button 1204, the processing transitions to S615.

In S615, the adjustment parameter designation unit 210 performs display control to display the adjustment parameter designation screen 501 on the display device 105. Here, the adjustment parameter designation screen 501 on which the values of the adjustment parameters determined in S608 are reflected is displayed. The user designates adjustment parameters by providing operations on the adjustment parameter designation screen 501. Accordingly, it is possible for the user to know how the layout image group can be adjusted, so that it is possible to prevent such a situation in which the layout image group is not changed even though the adjustment parameters are changed. The adjustment parameter designation unit 210 sends the adjustment parameters at the point in time where the OK button 505 is pressed to the image scoring unit 207.

In S616, the image scoring unit 207 executes the scoring again to the respective images in the album candidate image group, based on the score reference determined in S604 and the adjustment parameters designated in S615. Although the scores are given based on the score reference in S605, the scores are further adjusted in S616, based on the adjustment parameters. In the present embodiment, the explanation will be given with the examples of the number-of-photos parameter, the person photo ratio parameter, and the individual ratio parameter.

The layout target value, which is the target value of the total number of selected images to be used for the album, is calculated by the formula (9). The person photo target value, which is the number of person photos in the layout image group, is calculated by the formula (10). The individual ID target value, which is the target value of the number of images per individual in the person photo group, is calculated by the formula (11). The individual ID target value is found for each individual.

$$\text{Layout target value} = (\text{Number-of-photos parameter} + \text{Basic number of photos}) \times \text{Number of double spreads} \quad (9)$$

$$\text{Person photo target value} = \text{Number of images in layout image group} \times \text{Person photo ratio parameter} \quad (10)$$

$$\text{Individual } ID \text{ target value} = \text{Number of person photos} \times \text{Individual } ID \text{ ratio parameter} \quad (11)$$

Figure 13:
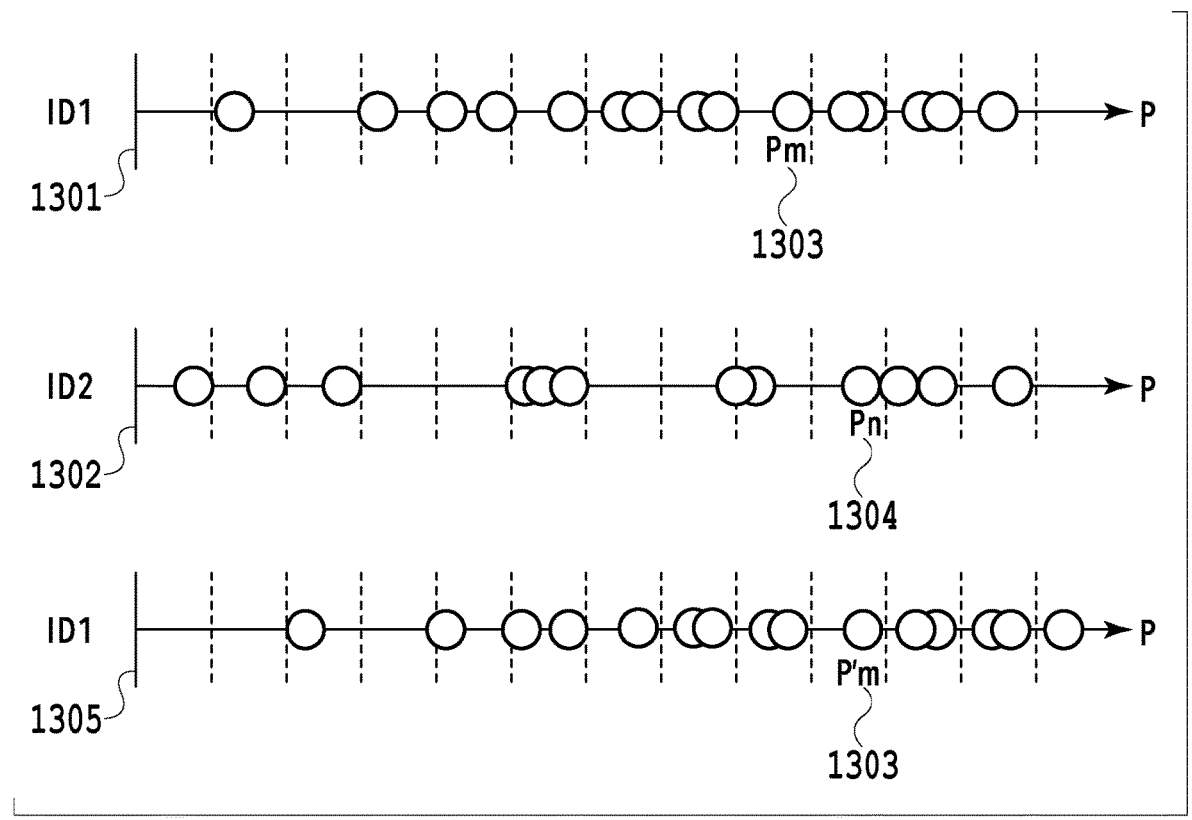
FIG. 13 is a diagram illustrating score adjustment.

FIG. 13 is a diagram for explaining score adjustment. The method of score adjustment based on the individual ratio parameter will be explained with reference to FIG. 13. FIG. 13 is a schematic diagram in which scores P given to images correspond to an axis and images in which the respective individual IDs are recorded are plotted on the axis. The axis 1301 represents images in which the individual ID1 is recorded. The axis 1302 represents images in which the individual ID2 is recorded. In a case when multiple individuals appear in an image, the same image is plotted for each individual ID. Here, for the sake of explanation, it is assumed that the person photo target value is 10 according to the formula (10) and the individual ID1 target value is 6 and the individual ID2 target value is 4 according to the formula (11).

The point 1303 is indicative of the score $P_m$ of the sixth image from the top out of the images of the individual ID1, which corresponds to the individual ID1 target value, and the point 1304 is indicative of the score $P_n$ of the fourth image from the top out of the scores of the individual ID2, which corresponds to the individual ID2 target value. The image scoring unit 207 adds a score to the image group on the axis 1301 or the image group on the axis 1302 so that $P_m$ and $P_n$ are aligned. Here, $P_n-P_m$ is added to all the images on the axis 1301, which are in the image group of the individual ID1. The axis 1305 represents a state in which the images of the individual ID1 after the score is added are plotted, and, if the score after the addition is $P'_m$, $P'_m=P_m+(P_n-P_m)=P_n$.

Accordingly, in a case when ten person photos are selected from the highest score, six images of the individual ID1 and four images of the individual ID2 can be selected. Although the case of two individual IDs has been explained here, even in a case of multiple individual IDs, the addition may be similarly performed so that the target value of each individual ID becomes close to the target value which is found by the formula (11).

Next, the method of adjusting scores based on the person photo ratio parameter will be explained. Among the layout image group, the images with a person and the images without a person are respectively aligned on the axis of the scores P. According to the formula (9) and formula (10), the target value of the number of non-person photos is "Layout target value−Person photo target value". Therefore, as with the score adjustment based on the above-described individual ratio parameter, the addition of a score is performed so that the number of person photos and the number of non-person photos become closer to the respective target values in a case when images corresponding to the layout target value are selected from the top of the scores.

Finally, the addition is performed to the scores of the entire album candidate image group so that the designated number of images corresponding to the number-of-photos parameter will be selected. In the present embodiment, if a threshold value used by the image selection unit 211 is $P_{thr}$ and the score that is positioned at the layout target value in a case where the scores of the album candidate image group are aligned in descending order is $P_{target}$, the added value is $P_{thr}-P_{target}$.

Since various feature amounts have complex effects on the score reference determined by the score reference determination unit 206, in many cases, the score reference is not an index that can be simply presented to the user. However, if the adjustment parameter designation unit 210 designates an index that is important for the album as an adjustment parameter in the above-described processes to adjust scores, it is thereby possible to perform adjustment in line with the user's intention.

Returning to FIG. 6, the explanation is continued below. In S617, the image selection unit 211 reselects the layout image group as in S607, based on the scores on the respective images that are calculated in S616, and repeats the processes from S609.

If the automatic layout processing of FIG. 6 is completed, the layout information output unit 215 outputs the bitmap data (output image data) including the images laid out in the template, which is generated in S612, to the display device 105. That is, the layout confirmation screen 1201 of FIG. 12 is displayed. The above is the explanation relating to the automatic layout processing flow in which the user reselects images by designating adjustment parameters. The generated image data may be uploaded to a server via the Internet, based on a user's instruction. Based on the uploaded image data, printing and bookbinding processes are executed to create an album (photobook) as a booklet, and the album will be delivered to the user.

As explained above, according to the present embodiment, it is possible to appropriately select images in line with the user's intention. More specifically, in the present embodiment, the state of an image selection result can be shown to the user by determining the initial values of the adjustment parameters based on the image selection result. Although the layout image group is automatically selected based on the user images in the user image group in the present embodiment, it is possible for the user to adjust this selection result in line with the user's own intention. Therefore, if the user readjusts the adjustment parameters, it is thereby possible to perform adjustment in line with the user's intention. As a result, it is possible to appropriately select images in line with the user's intention. In the present embodiment, the selection result in which the layout image group is automatically selected based on the user images in the user image group, instead of the overall tendency of the layout image group, is adjusted. Therefore, for example, even in a case when the overall tendency of the layout image group is different from the tendency of the user image group, the number of images and the appearance frequency of each object are reflected in the selection result according to the user image group. For such a selection result as described above, if the user further adjusts the adjustment parameters, it is thereby possible to perform adjustment more in line with the user's intention.

Second Embodiment

In the first embodiment, the explanation was given of the example in which the scores are adjusted based on the adjustment parameters designated by the adjustment parameter designation unit 210. In the second embodiment, an explanation will be given of the example in which the score reference is adjusted based on the adjustment parameters designated by the adjustment parameter designation unit 210.

Figure 14:
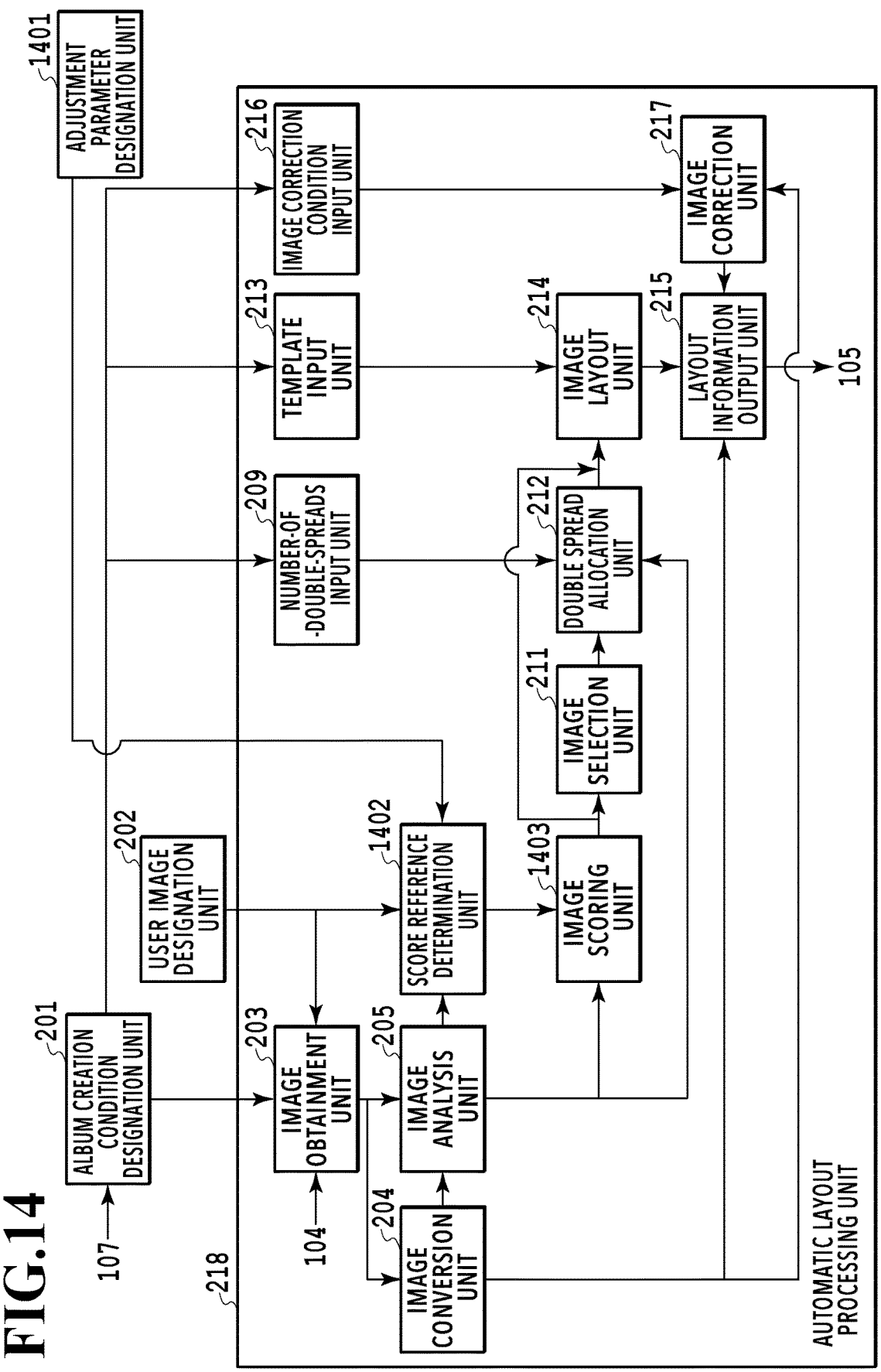
FIG. 14 is a software block diagram of the album creation application.

FIG. 14 is a software block diagram of the album creation application in the second embodiment. Since the configurations with the same numbers as those in FIG. 2 carry out the same processing as the processing explained in the first embodiment, explanations thereof are omitted here.

As with the adjustment parameter designation unit 210, the adjustment parameter designation unit 1401 allows the user to designate adjustment parameters by displaying the adjustment parameter designation screen 501 on the display device 105. In the present embodiment, the initial values of the adjustment parameters may be designated by the user before the automatic layout processing, or initial values incorporated in the application in advance may be used. Further, as explained in the first embodiment, the determination may be made according to the images in the layout image group that are selected first. The designated adjustment parameters are output to the score reference determination unit 1402.

The score reference determination unit 1402 determines the score reference by use of the adjustment parameters that are designated by the adjustment parameter designation unit 1401, in addition to using the feature amounts of the user image group that is designated by the user image designation unit 202 from among the respective feature amounts obtained from the image analysis unit 205. The score reference determination unit 1402 outputs the determined score reference to the image scoring unit 1403.

The image scoring unit 1403 scores each image of the album candidate image group by use of the score reference that is obtained from the score reference determination unit 1402 and the feature amounts that are obtained from the image analysis unit 205.

Figure 15:
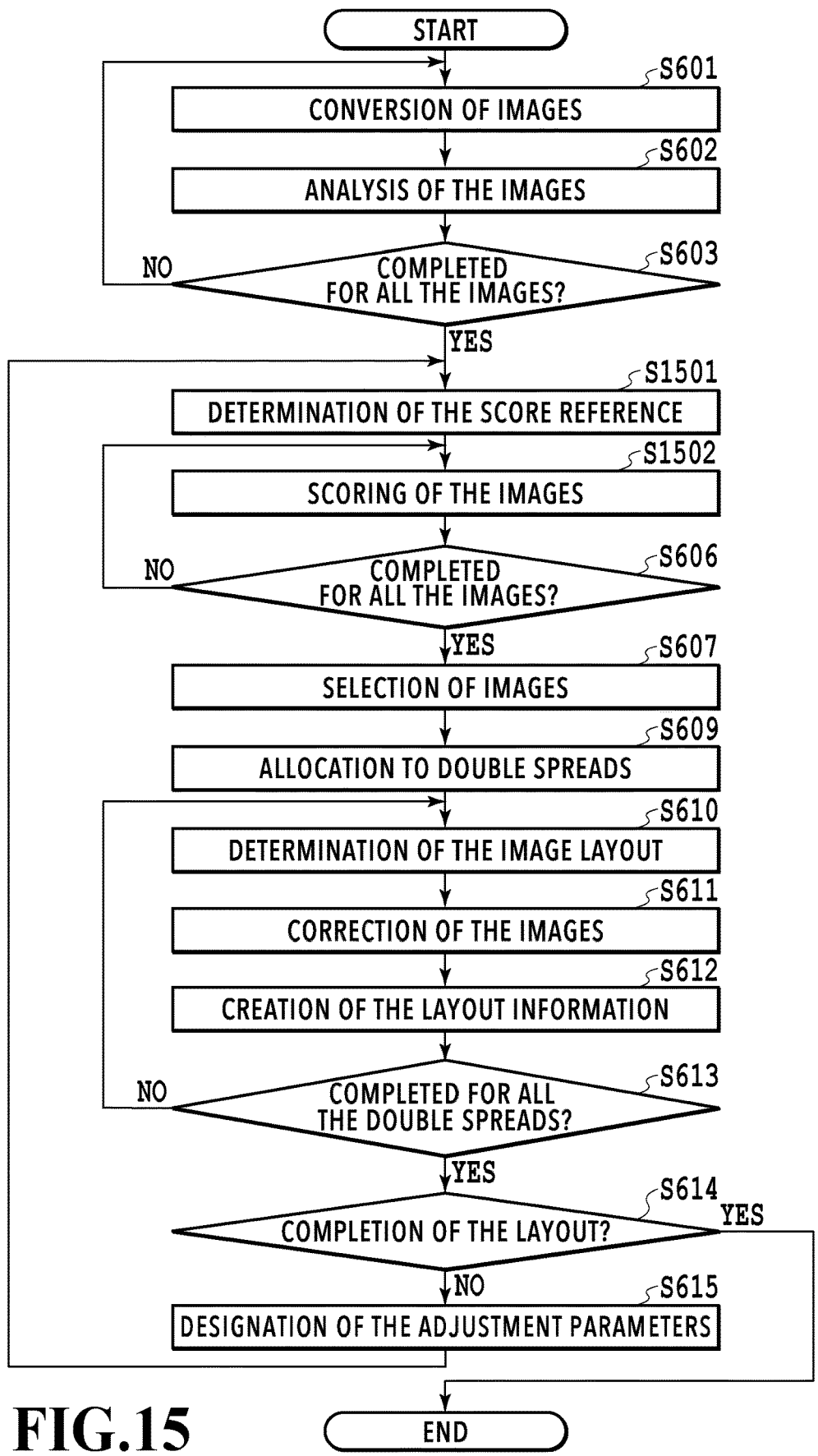
FIG. 15 is a flowchart illustrating the automatic layout processing.

FIG. 15 is a flowchart illustrating the processing performed by the automatic layout processing unit 218 of the album creation application in the present embodiment. Since the processes with the same numbers as those in FIG. 6 carry out the same processing as the processing explained in the first embodiment, explanations thereof are omitted here.

After the image analysis is completed in S601 to S603, the processing proceeds to S1501. In S1501, the score reference determination unit 1402 determines the score reference to be used by the image scoring unit 1403, based on the feature amounts corresponding to the image IDs of the user image group and the adjustment parameters.

Figure 16:
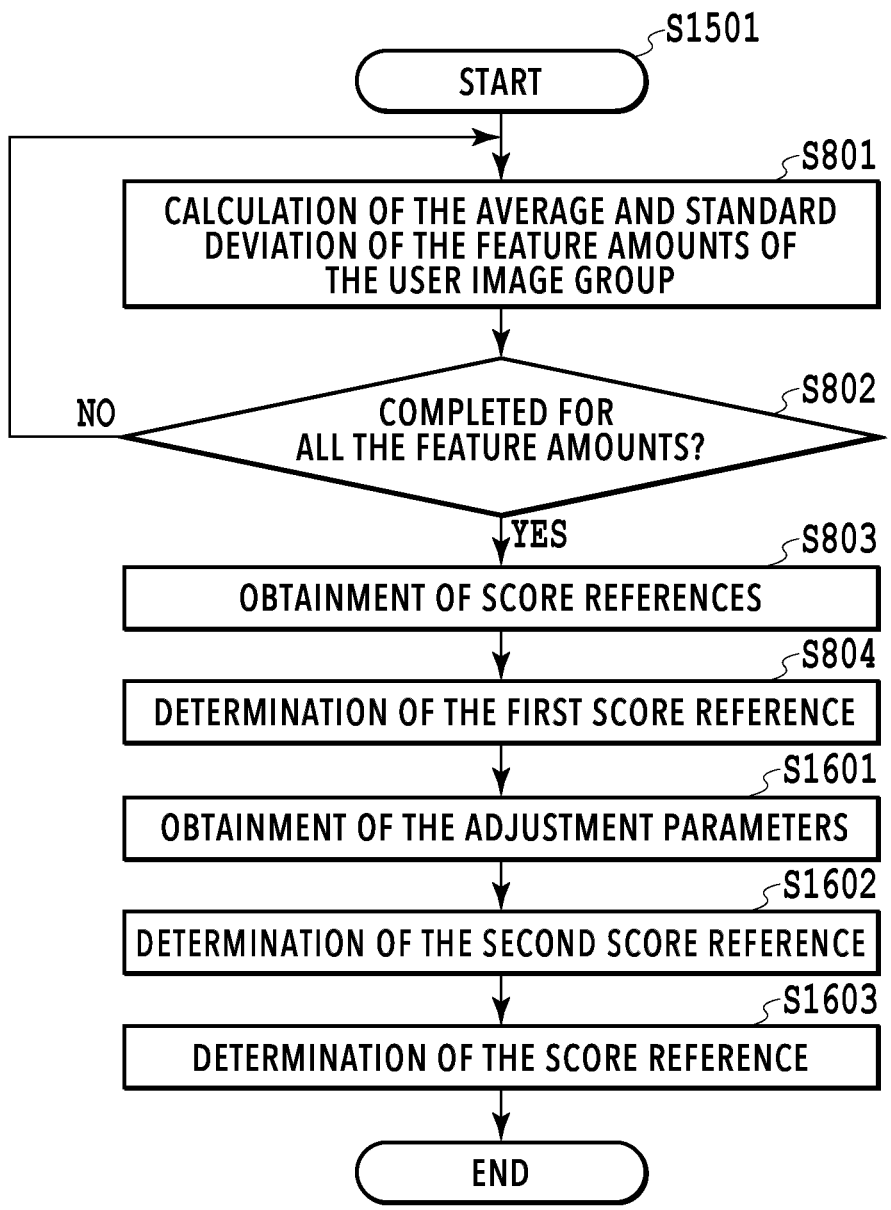
FIG. 16 is a flowchart illustrating the details of the score reference determination process.

FIG. 16 is a flowchart illustrating the details of the score reference determination process of S1501. Since the processes in FIG. 16 shown by the same numbers as those in FIG. 8 carry out the same processing as those in FIG. 8, explanations thereof are omitted here. The score reference determined in S804 is referred to as the first score reference. After determining the first score reference in S804, the processing proceeds to S1601.

In S1601, the score reference determination unit 1402 obtains the adjustment parameters from the adjustment parameter designation unit 1401. In the present embodiment, the number-of-photos parameter, the person photo ratio parameter, and the individual ratio parameter are used as the adjustment parameters. Unlike the example of the first embodiment, each adjustment parameter represents a change from the standard setting in the present embodiment. For example, if the slider bar for the number of photos 502 on the adjustment parameter designation screen 501 has five steps and the center of the slider bar is set as the standard setting, the number-of-photos adjustment parameter takes a value of −2 to +2. Here, it is assumed that the steps and standard setting of the slider bar are set in the program in advance. Further, not limited to the slider bar, for example, ON and OFF with a check box may be assigned to the adjustment parameters 0 and 1, respectively.

In S1602, the score reference determination unit 1402 determines the second score reference. The first score reference that is determined in S804 is a score reference based on the feature amounts of the user images selected by the user. On the other hand, the second score reference is a score reference that is determined based on the adjustment parameters obtained in S1601. In the present embodiment, the score reference based on each of the number-of-photos parameter, the person photo ratio parameter, and the individual ratio parameter are determined as the second score reference. Further, thereafter, in S1603, the score reference to be used by the image scoring unit 1403 is determined by use of these first score reference and the second score reference. Hereinafter, the process of determining the second score reference will be explained.

Figure 17:
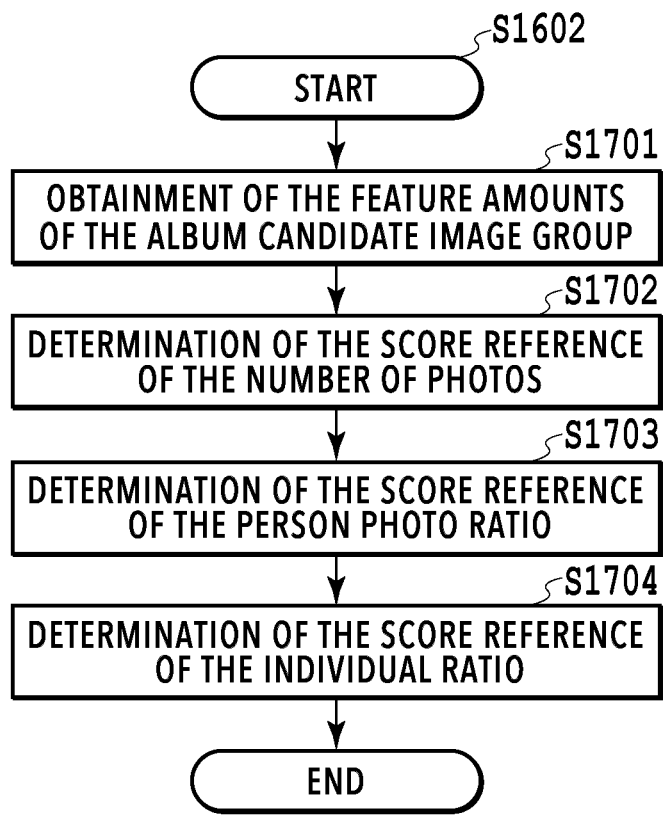
FIG. 17 is a flowchart for explaining the second score reference determination process.

FIG. 17 is a flowchart for explaining the second score reference determination process. In S1701, the score reference determination unit 1402 obtains the feature amounts of the respective images in the album candidate image group, which are analyzed by the image analysis unit 205. Here, the face areas are obtained. A face area represents the area of the face region detected by the image analysis unit 205 in an attention image. Since the area of a face region detected by the image analysis unit 205 depends on the image size, it is also possible that a normalized numerical value that is obtained by dividing the area of the face region by the image size is used as a face area.

In S1702, the score reference determination unit 1402 determines the score reference SS, which is associated with the number-of-photos parameter, by the formula (12) and formula (13).

$$R = 0.3 \times \Sigma Pj \qquad (12)$$

$$^S S = \text{Number-of-photos parameter} \times R \qquad (13)$$

Here, R represents the degree of effect that the number-of-photos parameter has on scores, and, by changing the coefficient 0.3 in the formula (12), the degree of effect can be adjusted. Although the coefficient is incorporated in the application in advance in the present embodiment, it is also possible that the coefficient can be designated. Pj is indicative of the score of each attention image as explained in the first embodiment. The number of photos can be adjusted by adjusting the overall scores with the formula (13).

In S1703, the score reference determination unit 1402 determines the score reference $^F S$, which is associated with the person photo ratio parameter, by the formula (14).

$$^F S = \text{Person photo ratio parameter} \times R \times (\text{Face area} - \text{Average value of Face areas})/\text{Standard deviation of face areas} \qquad (14)$$

Here, the average value of the face areas and the standard deviation of the face areas represent the average value and standard deviation of the face areas of all the images in the album candidate image group.

In S1704, the score reference determination unit 1402 determines the score reference $^{pk}S$, which is associated with the individual ratio parameter, by the formula (15).

$$^{pk}S = \text{Individual ratio parameter} \times R \times (\text{Face area of individual } IDk - \text{Average value of face areas of individual } IDk)/\text{Standard deviation of face areas of individual } IDk \qquad (15)$$

Here, the average value and standard deviation of face areas of the individual IDk represent the average value and standard deviation of the face areas of the individual IDk of all the images in the album candidate image group. $^{pk}S$ is calculated for the number-of-people Np that is designated on the adjustment parameter designation screen 501. In this way, the score reference based on each of the number-of-photos parameter, the person photo ratio parameter, and the individual ratio parameter are determined as the second score reference. Returning to FIG. 16, the explanation will be continued.

In S1603, the score reference determination unit 1402 combines the first score reference and the second score reference, so as to determine the score reference to be used by the image scoring unit 1403. Here, the formula (15), which is obtained by adding the first score reference and the second score reference, is set as the final score reference.

$$Qj = Pj + ^S Sj + ^F Sj + \Sigma[k=1 \ldots Np]^{pk} Sj/Np \qquad (15)$$

Here, Qj represents the score of each attention image. Accordingly, in addition to scores in which the user's intention based on the user selection image group is reflected, scores in which the adjustment parameters are reflected can be given. Although the formula (2) or (3), as well as the formula (13), the formula (14), and the formula (15) are uniformly added here, it is also possible to change emphasized scores by adding the respective scores with weights. The above is the explanation of the score reference determination process of S1501. Returning to FIG. 15, the explanation will be continued.

In S1502, the image scoring unit 1403 obtains the score reference that is determined by the score reference determination unit 1402 and executes the scoring on each image in the album candidate image group, based on the score reference. The given scores are provided to the image selection unit 211. The other processes are the same as those in the example explained in the first embodiment. In the present embodiment, after the adjustment parameters are designated in S615, the score reference determination process of S1501 is performed again. In the first score reference determination process of S1501, the adjustment parameter designation screen 501 may or may not be displayed as explained in the first embodiment.

As explained above, according to the present embodiment, the score reference that is determined from two viewpoints, i.e., the first score reference based on the user image group and the second score reference based on the adjustment parameters, is used. Accordingly, it is possible to reflect the user's manual adjustment while grasping the user's intention based on the user images.

Embodiment(s) of the present disclosure can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An image processing apparatus comprising:
one or more processors; and
a memory storing instructions that, when executed by the one or more processors, causes the image processing apparatus to function as:
a first designation unit configured to designate a first image group;
a first selection unit configured to select a second image group from the first image group based on a user operation that designates the second image group from the first image group;
an analysis unit configured to analyze an image included in the second image group;
a determination unit configured to determine a reference for selecting an image from the first image group, based on a result of analyzing the image included in the second image group;
a second selection unit configured to select a third image group from the first image group, which is an image group from which the second image group is selected, based on the reference based on the analysis result of the image included in the second image group;
a first display control unit configured to display a first album by automatically arranging the third image group in a plurality of templates;
a changing unit configured to accept a change in a parameter that is obtained from the third image group selected by the second selection unit and corresponds to the third image group included in the displayed first album, after the first album is displayed, by automatically arranging the third image group in the plurality of templates and to produce a changed parameter, the parameter including at least one of the number of images to be selected by the selection unit, a ratio of images including a person in the images to be selected, and a ratio of images with a specific person in the images to be selected;
a third selection unit configured to select a fourth image group from the first image group, which is an image group from which the second image group and the third image group are selected, by use of the changed parameter; and
a second display control unit configured to display a second album by automatically arranging the fourth image group in the plurality of templates.

2. The image processing apparatus according to claim 1, wherein the third selection unit is configured to determine a score of each image included in the first image group, based on the parameter changed by the changing unit and to select the fourth image group based on the determined score.

3. The image processing apparatus according to claim 1, wherein the reference is determined again further based on the parameter changed by the changing unit, and the fourth image group is selected based on the reference that is determined again.

4. The image processing apparatus according to claim 1, further comprising a second determination unit configured to determine an initial value of the parameter, based on the image selected by the second selection unit.

5. The image processing apparatus according to claim 4, wherein the changing unit is configured to cause a display unit to display a screen on which the initial value of the parameter determined by the second determination unit is set, so as to accept a change in the parameter via the display unit.

6. An image processing method comprising:
designating a first image group;
selecting a second image group from the first image group based on a user operation that designates the second image group from the first image group;
analyzing an image included in the second image group;
determining a reference for selecting an image from the first image group, based on a result of analyzing the image included in the second image group;
selecting a third image group from the first image group, which is an image group from which the second image group is selected, based on the reference based on the analysis result of the image included in the second image group;

displaying a first album by automatically arranging the third image group in a plurality of templates;

accepting a change in a parameter that is obtained from the selected third image group and corresponds to the third image group included in the displayed first album, after the first album is displayed, by automatically arranging the third image group in the plurality of templates and producing a changed parameter, the parameter including at least one of the number of images to be selected by the selection unit, a ratio of images including a person in the images to be selected, and a ratio of images with a specific person in the images to be selected;

selecting a fourth image group from the first image group, which is an image group from which the second image group and the third image group are selected, by use of the changed parameter; and displaying a second album by automatically arranging the fourth image group in the plurality of templates.

7. The image processing method according to claim 6, wherein the selecting the fourth image group includes determining a score of each image included in the first image group, based on the changed parameter and selecting the fourth image group based on the determined score.

8. The image processing method according to claim 6, wherein the reference is determined again further based on the changed parameter, and the fourth image group is selected based on the reference that is determined again.

9. The image processing method according to claim 6, further comprising determining an initial value of the parameter, based on the selected image.

10. The image processing method according to claim 8, wherein the changing is to cause a display unit to display a screen on which the determined initial value of the parameter is set, so as to accept a change in the parameter via the display unit.

11. A non-transitory computer readable storage medium storing a program that causes a computer to function as an image processing apparatus comprising:

a first designation unit configured to designate a first image group;

a first selection unit configured to select a second image group from the first image group based on a user operation that designates the second image group from the first image group;

an analysis unit configured to analyze an image included in the second image group;

a determination unit configured to determine a reference for selecting an image from the first image group, based on a result of analyzing the image included in the second image group;

a second selection unit configured to select a third image group from the first image group, which is an image group from which the second image group is selected, based on the reference based on the analysis result of the image included in the second image group;

a first display control unit configured to display a first album by automatically arranging the third image group in a plurality of templates;

a changing unit configured to accept a change in a parameter that is obtained from the third image group selected by the second selection unit and corresponds to the third image group included in the displayed first album, after the first album is displayed, by automatically arranging the third image group in the plurality of templates and to produce a changed parameter, the parameter including at least one of the number of images to be selected by the selection unit, a ratio of images including a person in the images to be selected, and a ratio of images with a specific person in the images to be selected;

a third selection unit configured to select a fourth image group, which is an image group from which the second image group and the third image group are selected, from the first image group by use of the changed parameter; and a second display control unit configured to display a second album by automatically arranging the fourth image group in the plurality of templates.

12. The non-transitory computer readable storage medium according to claim 11, wherein the third selection unit is configured to determine a score of each image included in the first image group, based on the parameter changed by the changing unit, and to select the fourth image group based on the determined score.

13. The non-transitory computer readable storage medium according to claim 11, wherein the reference is determined again further based on the parameter changed by the changing unit, and the fourth image group is selected based on the reference that is determined again.

14. The non-transitory computer readable storage medium according to claim 11, further comprising a second determination unit configured to determine an initial value of the parameter, based on the image selected by the second selection unit.

15. The non-transitory computer readable storage medium according to claim 14, wherein the changing unit is configured to cause a display unit to display a screen on which the initial value of the parameter determined by the second determination unit is set, so as to accept a change in the parameter via the display unit.

16. The image processing apparatus according to claim 1, wherein the reference is a reference to determine a score of each image included in the first image group, and the reference is different from the parameter.

17. The image processing method according to claim 6, wherein the reference is a reference to determine a score of each image included in the first image group, and the reference is different from the parameter.

18. The non-transitory computer readable storage medium according to claim 11, wherein the reference is a reference to determine a score of each image included in the first image group, and the reference is different from the parameter.

* * * * *